(12) United States Patent
Chaplin

(10) Patent No.: US 11,490,556 B2
(45) Date of Patent: Nov. 8, 2022

(54) SEED SOWING APPARATUS AND METHOD OF SOWING SEED

(71) Applicant: Simon Robert Frank Chaplin, Great Abington (GB)

(72) Inventor: Simon Robert Frank Chaplin, Great Abington (GB)

(*) Notice: Subject to any disclaimer, the term of this patent is extended or adjusted under 35 U.S.C. 154(b) by 399 days.

(21) Appl. No.: 16/474,935

(22) PCT Filed: Jan. 22, 2018

(86) PCT No.: PCT/GB2018/050179
§ 371 (c)(1),
(2) Date: Jun. 28, 2019

(87) PCT Pub. No.: WO2018/138480
PCT Pub. Date: Aug. 2, 2018

(65) Prior Publication Data
US 2021/0127554 A1    May 6, 2021

(30) Foreign Application Priority Data

Jan. 25, 2017  (GB) ...................................... 1701247
Feb. 24, 2017  (GB) ...................................... 1702997
(Continued)

(51) Int. Cl.
*A01C 5/06*    (2006.01)
*A01C 7/08*    (2006.01)

(52) U.S. Cl.
CPC .............. *A01C 5/062* (2013.01); *A01C 5/066* (2013.01); *A01C 7/08* (2013.01)

(58) Field of Classification Search
CPC ............ A01C 5/062; A01C 5/066; A01C 7/08
See application file for complete search history.

(56) References Cited

U.S. PATENT DOCUMENTS

| 234,730 A | 11/1880 | Shreiner |
| 457,699 A * | 8/1891 | Bourell .................. A01B 45/00 111/12 |

(Continued)

FOREIGN PATENT DOCUMENTS

| AU | 20249/83 A | 5/1984 |
| CA | 2542700 A1 | 10/2007 |

(Continued)

OTHER PUBLICATIONS

European Communication pursuant to Article 94(3) EPC for European Application No. 18707124, dated Jul. 16, 2020, 7 pages.

(Continued)

*Primary Examiner* — Thomas B Will
*Assistant Examiner* — Ian A Normile
(74) *Attorney, Agent, or Firm* — TraskBritt

(57) ABSTRACT

Seed sowing apparatus comprising: a frame defining a leading part supporting a soil opening stage and a trailing part supporting a soil closing stage trailing the soil opening stage, wherein the soil opening stage comprises a plurality of laterally spaced seeding units, each seeding unit comprising a soil opening member associated with a respective seed delivery outlet connected to a seed source, wherein each seeding unit is configured to form a respective seeded trench in the ground when the apparatus is in use driven through soil in a forward direction of travel; wherein the soil closing stage comprises a plurality of laterally spaced soil deflection members each associated with a respective one of the seeding units, each soil deflection member being spaced laterally from the soil opening member of its respective seeding unit and configured to deflect soil toward the seeded trench formed by the seeding unit.

21 Claims, 21 Drawing Sheets

(30) Foreign Application Priority Data

| Apr. 7, 2017 | (GB) | 1705638 |
| Jun. 19, 2017 | (GB) | 1709742 |
| Sep. 26, 2017 | (GB) | 1715587 |

(56) References Cited

U.S. PATENT DOCUMENTS

| 2,764,111 | A | * | 9/1956 | Collins | A01C 7/06 |
| | | | | | 111/70 |
| 3,850,119 | A | * | 11/1974 | Wolsky | A01C 7/00 |
| | | | | | 111/14 |
| 4,798,151 | A | | 1/1989 | Rodrigues et al. | |
| 4,926,767 | A | * | 5/1990 | Thomas | A01C 7/06 |
| | | | | | 111/194 |
| 5,001,995 | A | | 3/1991 | Mikkelsen | |
| 5,913,368 | A | * | 6/1999 | Horton | A01C 23/025 |
| | | | | | 172/133 |
| 5,996,514 | A | * | 12/1999 | Arriola | A01M 17/002 |
| | | | | | 111/124 |
| 6,640,731 | B1 | | 11/2003 | Rowlett et al. | |
| 8,161,894 | B1 | | 4/2012 | Albright et al. | |
| 2007/0245939 | A1 | | 10/2007 | Gehrer | |
| 2011/0168068 | A1 | * | 7/2011 | Senchuk | A01C 5/062 |
| | | | | | 111/152 |
| 2018/0139886 | A1 | * | 5/2018 | Dietrich, Sr. | A01B 49/04 |

FOREIGN PATENT DOCUMENTS

| DE | 0322713 C | 7/1920 | |
| DE | 2321859 B1 | 8/1974 | |
| DE | 4235814 A1 | 4/1994 | |
| DE | 102010000527 A1 | 8/2011 | |
| EP | 3069592 A1 | 9/2016 | |
| EP | 3222127 A1 | 9/2017 | |
| FR | 1534713 A | 8/1968 | |
| FR | 2573952 A1 * | 6/1986 | A01C 7/08 |
| GB | 1101702 A | 1/1968 | |
| GB | 1197626 A | 7/1970 | |
| GB | 1226005 A | 3/1971 | |
| WO | WO-9015520 A1 * | 12/1990 | A01C 5/062 |
| WO | 97/21338 A1 | 6/1997 | |
| WO | 2014/117210 A1 | 8/2014 | |
| WO | WO-2019100833 A1 * | 5/2019 | B05B 15/652 |

OTHER PUBLICATIONS

United Kingdom Search Report for United Kingdom Application No. GB1800978.7, dated May 16, 2019, 3 pages.

United Kingdom Search Report for United Kingdom Application No. GB1800978.7, dated Jul. 17, 2018, 2 pages.

International Written Opinion for International Application No. PCT/GB2018/050179, dated Jun. 28, 2018, 14 pages.

International Search Report for International Application No. PCT/GB2018/050179, dated Jun. 28, 2018, 07 pages.

* cited by examiner

SEED SOWING APPARATUS AND METHOD OF SOWING SEED

CROSS-REFERENCE TO RELATED APPLICATIONS

This application is a national phase entry under 35 U.S.C. § 371 of International Patent Application PCT/GB2018/050179, filed Jan. 22, 2018, designating the United States of America and published in English as International Patent Publication WO 2018/138480 A1 on Aug. 2, 2018, which claims the benefit under Article 8 of the Patent Cooperation Treaty to Great British Patent Application Serial Nos. 1701247.7, filed Jan. 25, 2017; 1702997.6, filed Feb. 24, 2017; 1705638.3, filed Apr. 7, 2017; 1709742.9, filed Jun. 19, 2017; and 1715587.0, filed Sep. 26, 2017.

TECHNICAL FIELD

This disclosure relates to seed sowing apparatus and a method of sowing seed. A variety of types of seed sowing (or "seed drill") devices are known in the art. Typically such devices comprise a tractor-towable frame supporting a leading soil opening/seed depositing stage followed by a trailing soil closing stage.

BACKGROUND

The soil opening stage may take various forms but typically comprises a plurality of laterally spaced soil opening members each associated with a seed delivery outlet connected to a seed source (typically a metered seed supply). In one well known arrangement, the soil opening stage comprises rows of drilling tines each operative to form a trench for receiving seeds via the seed delivery outlet.

Typically the soil closing stage comprises a roller or wheel for compacting soil parted by the soil opening stage.

One problem with known seed drill devices is that seed drilling may only be performed when soil conditions are suitable. If the soil is too wet, the roller or wheel of the soil closing stage will quickly become clogged preventing optimal operation. This problem is particularly acute in the case of heavy (e.g., high clay content) soils.

The present inventor has identified the need for an improved seed sowing device capable of operating in adverse soil conditions.

BRIEF SUMMARY

In accordance with a first aspect of this disclosure, there is provided a seed sowing apparatus comprising: a frame (e.g., towable frame) defining a leading part supporting a soil opening stage and a trailing part supporting a soil closing stage trailing (e.g., spaced rearward of) the soil opening stage, wherein the soil opening stage comprises a plurality of laterally spaced seeding units, each seeding unit comprising a soil opening member associated with a respective seed delivery outlet connected to a seed source, wherein each seeding unit is configured to form a respective seeded trench in the ground when the apparatus is in use driven through soil in the forward direction of travel; wherein the soil closing stage comprises a plurality of laterally spaced soil deflection members each associated with a respective one of the seeding units, each soil deflection member being spaced laterally (and longitudinally) from the soil opening member of its respective seeding unit and configured to deflect soil toward the seeded trench formed by the seeding unit.

In this way, seed sowing apparatus (e.g., a seed drill) is provided which is capable of sowing seed in saturated heavy soil during periods when conventional seed drills utilizing a roller or wheel levelling device to perform soil closing of seeded trenches would be unsuitable for use.

In one embodiment, each soil deflection member is configured to form an unseeded trench (e.g., substantially unseeded) that it is spaced laterally from the seeded trench formed by its respective seeding unit and deflects soil removed to form the unseeded trench toward the seeded trench. Each soil deflection member may be sufficiently laterally spaced to form the unseeded trench spaced from the seeded trench but sufficiently close that soil displaced during formation of the unseeded trench substantially covers the seeded trench. Typically each seeded trench is closed by a respective unseeded trench forming soil deflection member, but in the case of apparatus with multiple rows of seeding units, a seeded trench formed by the seeding unit of a leading row may be closed by a seeding unit of a trailing row (i.e., with only the seeded trenches formed by the trailing row of seeding units being closed by the unseeded trench forming soil deflection members).

In one embodiment the seed sowing apparatus is configured to function without any soil levelling device (e.g., no roller or wheels in line with the soil opening members). In this way, the unseeded trenches formed by the trailing soil closing stage are left open.

In one embodiment, the seed sowing apparatus is rollerless.

In one embodiment, the seed sowing apparatus is wheel less (or at least there are no wheels in line with the soil opening members).

In one embodiment, the seed sowing apparatus is configured to be towed or pushed by a vehicle (e.g., by a tractor or the like). In one embodiment, the frame is configured to be attached to a tractor hitch (e.g., 3-point hitch).

In one embodiment, the plurality of seeding units are provided in at least first and second longitudinally-spaced rows (e.g., leading and trailing rows).

In one embodiment, each soil deflection member is associated with a pair of seeding units. In one embodiment, the soil deflection member is positioned laterally between the pair of seeding units.

In one embodiment, the seeding units of each pair are longitudinally spaced from one another (e.g., a leading seeding unit of the pair is located in the first row and a trailing seeding unit of the pair is located in the second row).

In one embodiment each pair of seeding units is longitudinally offset relative to a neighboring pair.

In one embodiment, each soil deflection member is longitudinally offset relative to a neighboring soil deflection member.

In one embodiment, each soil opening member comprises a seed drilling tine.

In one embodiment, each soil deflection member comprises a trailing soil opening member. Since no seeds are delivered by the soil closing stage each trailing soil opening member will not be operative to receive seeds from the/any seed source.

In one embodiment, each trailing soil opening member comprises a seed drilling tine.

In one embodiment, each soil opening member is set to a first depth and the associated soil deflection member is set to a second depth (e.g., relative to a central axis of the frame).

In one embodiment, the first depth is greater than the second depth (e.g., over 50% greater).

In one embodiment, the depth of each soil opening member and/or associated soil deflection member is adjustable (e.g., independently adjustable). For example, the depth of each member may be adjusted by lowering or raising the member relative to the frame.

In one embodiment, the frame orientation is adjustable relative to a device pulling/pushing the frame (e.g., tractor).

In one embodiment, the depth relative to the device is variable.

In one embodiment, the tilt (e.g., height of a leading part of the frame relative to trailing part of the frame) is adjustable.

In one embodiment, the trailing soil opening member is associated with a pest control composition delivery device (e.g., slug pellet delivery device). In this way, unwanted pests may be lured into the open unseeded trenches and away from the adjacent closed seeded trenches.

In accordance with a second aspect of this disclosure, there is provided a method of sowing seed, comprising: forming a plurality of seeded trench sections in soil; and subsequently forming adjacent each seeded trench section an unseeded soil displacement trench section, the unseeded soil displacement trench section being positioned relative to the seeded trench section such that soil displaced during formation of the unseeded soil displacement trench section covers (e.g., substantially covers) the adjacent seeded trench section.

In one embodiment, the step of subsequently forming the unseeded soil displacement trench sections comprises forming the unseeded soil displacement trench sections between adjacent pairs of seeded trench sections.

In one embodiment, the step of forming the plurality of seeded trench sections is performed by a leading part of a seed sowing device, and the step of subsequently forming the unseeded soil displacement trench sections adjacent each seeded trench section is performed by a trailing part of the seed sowing device (e.g., with longitudinally spaced sections of seeded trench and unseeded soil displacement trench being formed simultaneously by the seed sowing device).

In one embodiment, the method further comprises depositing a pest control composition (e.g., slug pellets or the like) into the unseeded soil displacement trench. In one embodiment, the pest control composition is deposited by a pest control composition delivery device provided on the seed sowing device (e.g., with the depositing step occurring as the unseeded soil displacement trench is formed).

In one embodiment, the method includes leaving the unseeded soil displacement trench sections open to the environment (e.g., with no soil covering or soil levelling step subsequent to the step of forming the unseeded soil displacement trench sections).

In one embodiment, the seed sowing device comprises seed sowing apparatus in accordance with any embodiment of the first aspect of this disclosure.

In accordance with a third aspect of this disclosure, there is provided a soil opener for driving through soil in a forward direction, the soil opener comprising: a support (e.g., frame support); and a soil opening member mounted to the support.

In one embodiment, the soil opening member comprises a first soil engaging part and a second soil engaging part supported by the first soil engaging part, the second soil engaging part defining a leading forward facing soil engagement surface and the first soil engaging part defining a trailing forward facing soil engagement surface.

In one embodiment, one or more of the leading forward-facing soil engagement surface and the trailing forward-facing soil engagement surface extends substantially perpendicular to the forward direction.

In one embodiment, the second soil engaging part is positioned wholly or substantially in advance of the first soil engaging part (e.g., mounted to a front face of the first soil engaging part).

In one embodiment, the first soil engaging part has a width (e.g., an effective width) in the direction of travel greater than a width (e.g., an effective width) of the second soil engaging part. For example, the first soil engaging part may have a width (e.g., effective width) in the direction of travel that is at least twice the width (e.g., effective width) of the second soil engaging part.

In one embodiment, the first soil engaging part comprises a tine (e.g., leg tine).

In one embodiment, the second soil engaging part comprises a blade (e.g., seed drilling tine blade).

In one embodiment, the second soil engaging part projects beyond (e.g., substantially beyond) a lower edge of the first soil engaging part to form a leading trench. In this way, the second soil engaging part will penetrate deeper into the soil to form a relatively deep but typically narrow trench.

In one embodiment, the soil opener further comprises at least one soil deflection member (e.g., provided on or as part of the first soil engaging part) configured to deflect soil toward a leading trench formed by the second soil engaging part (e.g., to cover the leading trench). In this way, small seeds may be discouraged from falling into the leading trench (which is deeper than the wider trench formed by the second soil engaging part).

In one embodiment, the at least one soil deflection member (or soil displacement member) is laterally spaced from the second soil engaging part (e.g., with a gap being visible therebetween when viewed from the front).

In one embodiment, the at least one soil deflection member is substantially aligned with the forward direction.

In one embodiment the at least one soil deflection member is inclined relative to the forward direction (e.g., for an increased soil deflection action). The at least one soil deflection member may be laterally or vertically inclined.

In one embodiment, the at least one soil deflection member comprises a pair of soil deflection members provided on apposed lateral sides of the second soil engaging part.

In one embodiment, the soil opener further comprises at least one soil lifting member (e.g., provided on or as part of the second soil engaging part).

In one embodiment, the soil lifting member comprises a soil deflection surface angled to encourage upward displacement of soil.

In one embodiment, the at least one soil lifting member comprises a pair of soil deflection surfaces provided on apposed lateral sides of the second soil engaging part.

In one embodiment, the soil opener further comprises a seed delivery outlet (e.g., mounted to the first soil engaging member or to a further support), the seed delivery outlet comprising an upper body section for connection to a seed delivery hose and a lower body section defining an exit aperture for releasing seed.

In one embodiment, the lower body section has a restricted width in the direction of travel relative to the upper body section.

In one embodiment, the lower body section is substantially concealed from view by the first soil engaging part when viewed from the front.

In one embodiment, the upper body section is substantially tubular.

In one embodiment, the lower body section has a width in the direction of travel that is smaller than a width of the upper body section (e.g., tapered end).

In one embodiment, the lower body section has a (e.g., tapered) flattened tubular form (e.g., formed by compressing an end portion of a length of tubing).

In one embodiment, the exit aperture is inclined (e.g., relative to horizontal) such that a leading part of the exit aperture is lower than a trailing part of the exit aperture.

In one embodiment, the exit aperture is inclined by 40-70° (e.g., substantially 60°).

In the case of a soil opener comprising at least one soil deflection member (e.g., provided on or as part of the first soil engaging part), the at least one soil deflection member may be configured to deflect seed as the seed exits the seed delivery outlet. For example, the soil deflection member may substantially extend along a full length of the seed delivery outlet (e.g., full length in the direction of travel).

In the case of a soil opener comprising a seed delivery outlet as defined above, the soil opener may further comprise at least one trailing soil closing member configured to deflect soil toward a main seed trench formed by the soil opening member (e.g., trench formed by the first soil engaging part).

In one embodiment, the at least one trailing soil closing member comprises a blade (e.g., seed drilling tine blade).

In one embodiment, the at least one trailing soil closing member is supported by the first soil engaging member (e.g., attached to a lateral side thereof (or opposed lateral sides thereof in the case of a pair of trailing soil closing members) or by a further support (e.g., a further support adjacent the first soil engaging member)).

In one embodiment, the at least one trailing soil closing member defines a forward facing soil closing engagement surface having a bottom portion positioned rearward of at least a leading portion of the exit aperture and/or spaced rearward from the first soil engaging member by a soil flow gap. In this way, the soil closing action provided by the at least one trailing soil closing member will act to close the main seed trench after the depositing of seed via the seed delivery outlet.

In one embodiment, the forward facing soil closing engagement surface is inclined (e.g., relative to horizontal) such that a leading part of the forward facing soil closing engagement surface is higher than a trailing part of the forward facing soil closing engagement surface. In this way, in the case of a seed delivery outlet with an inclined exit aperture, the forward facing soil closing engagement surface may be inclined in an opposed sense to the inclined exit aperture.

In one embodiment, the forward facing soil closing engagement surface is inclined by 40-70° (e.g., substantially 60°) relative to horizontal.

In one embodiment, the at least one trailing soil closing member is orientated substantially vertically when viewed from the front.

In one embodiment, the at least one trailing soil closing member projects beyond (e.g., substantially beyond) a lower edge of the first soil engaging part.

In the case of a soil opener including a second soil engaging part, the second soil engaging part may project beyond (e.g., substantially beyond) a lower edge of the at least one trailing soil closing member.

In one embodiment, the soil opener further comprises at least one laterally extending soil engagement member (e.g., pair of laterally extending soil engagement members). Typically the at least one laterally extending soil engagement member is mounted to the first soil engaging part, although mounting to the second soil engaging part is also possible.

In one embodiment, the at least one laterally extending soil engagement member protrudes laterally beyond a lateral side of the first soil engaging part.

In one embodiment, the at least one laterally extending soil engagement member is elongate.

In one embodiment, the at least one laterally extending soil engagement member is removably received by an aperture (e.g., bolt hole) in the first soil engaging part.

In one embodiment, the at least one laterally extending soil engagement member is connected (e.g., welded) to the first soil engaging part (e.g., to an underside thereof).

In one embodiment, the at least one laterally extending soil engagement member is supported by the at least one soil deflection member. For example, the at least one laterally extending soil engagement member may be supported by a pair of laterally spaced soil deflection members (e.g., with the pair of laterally spaced soil deflection members being connected to an underside of the first soil engaging part).

In one embodiment, the at least one laterally extending soil engagement member extends beyond opposed lateral sides of the first soil engaging part.

In one embodiment, one or more of the first and second soil engaging parts comprises a wear-resistant outer layer (e.g., wear-resistant plate attached thereto). For example, a wear-resistant outer layer may be provided comprising tungsten (e.g., tungsten carbide or tungsten carbide composite material such as Ferobide™).

In one embodiment, a wear-resistant outer layer (e.g., wear-resistant plate) is provided on a front face of the second soil engaging part (e.g., to form the part of the leading forwarding facing soil engagement surface).

In one embodiment, a wear-resistant outer layer (e.g., wear-resistant plate) is provided on lateral sides of the first soil engaging part.

In one embodiment, the soil opening member is mountable to the support in one of a plurality of different height positions relative to the support (e.g., by means of a vertically extending series of apertures provided in the first soil engaging part).

In one embodiment, the soil opening member is resiliently mounted to the support. In one embodiment, the soil opening member is configured to transfer an impact force to a resilient member (e.g., rubber pad). In this way, the soil opening member may be provided with a degree of impact protection.

In one embodiment, the support is operative to hold the soil opening member in an inoperative (i.e., non-ground engaging/retracted) position in the event that the soil opening member becomes operatively detached from the support (e.g., as a result of a heavy impact). In one embodiment, the inoperative position is an inoperative inclined position.

In one embodiment, the support is operative to trap the soil opening member in the inoperative position (e.g., with the support and soil opening member having cooperating parts that prevent separation of the soil opening member from the support).

In accordance with a fourth aspect of this disclosure, there is provided seed sowing apparatus as defined in the first aspect of the disclosure (or any embodiment thereof) comprising a soil opener as defined in the third aspect of this disclosure (of any embodiment thereof).

In accordance with a fifth aspect of this disclosure, there is a method of manufacturing a soil opener for driving through soil in a forward direction, the method comprising: providing a first soil engaging part configured to define a first forward facing soil engagement surface; providing a second soil engaging part configured to define a second forward facing soil engagement surface; and forming a soil opening member by attaching (e.g., welding) the second soil engaging part to the first soil engaging part such that the second soil engaging part is supported by the first soil engaging part and whereby the second forward facing soil engagement surface defines a leading forward facing soil engagement surface and the first forward facing soil engagement surfaced defines a trailing forward facing soil engagement surface.

In one embodiment, the method further comprises attaching the soil opening member to a support (e.g., frame support). For example, the soil opening member may be bolted to the support (e.g., in one of a plurality of different height positions).

In one embodiment, the step of attaching the second soil engaging part to the first soil engaging part the method comprises mounting (e.g., welding) the second soil engaging part to a front face of the first soil engaging part.

In one embodiment, the first soil engaging part has a width (e.g., an effective width) in the direction of travel greater than a width (e.g., an effective width) of the second soil engaging part. For example, the first soil engaging part may have a width (e.g., effective width) in the direction of travel that is at least twice the width (e.g., effective width) of the second soil engaging part.

In one embodiment, the first soil engaging part comprises a tine (e.g., leg tine).

In one embodiment, the second soil engaging part comprises a blade (e.g., seed drilling tine blade).

In one embodiment, the step of attaching the second soil engaging part to the first soil engaging part comprises mounting the second soil engaging part so that it projects beyond (e.g., substantially beyond) a lower edge of the first soil engaging part.

In one embodiment, the method further comprises attaching (e.g., welding) at least one soil deflection member to the first soil engaging part (e.g., to an underside of the first soil engaging part).

In one embodiment, the method further comprises attaching (e.g., welding) at least one soil lifting member to the second soil engaging part.

In one embodiment, the method further comprises attaching a seed delivery outlet to the soil opening member (e.g., to the first soil engaging member or to a further support).

In one embodiment, the seed delivery outlet comprising an upper body section for connection to a seed delivery hose and a lower body section defining an exit aperture.

In one embodiment, the lower body section has a restricted width in the direction of travel relative to the upper body section. In one embodiment, the lower body section is formed by compressing (e.g., by means of a vice) one end of a tubular member (e.g., pipe member).

In one embodiment, the lower body section is substantially concealed from view by the first soil engaging part when viewed from the front.

In one embodiment, the exit aperture is inclined (e.g., relative to horizontal) such that a leading part of the exit aperture is lower than a trailing part of the exit aperture. In one embodiment, the inclined exit aperture is formed by forming an inclined cut through a section of a tubular member (e.g., before compressing the tubular member to form a restricted width).

In one embodiment, the exit aperture is inclined by 40-70° (e.g., substantially 60°) relative to horizontal.

In one embodiment, the method further comprises attaching at least one laterally extending soil engagement member (e.g., pair of laterally extending soil engagement members) to the soil opener. In one embodiment, the at least one laterally extending soil engagement member is positioned to protrude laterally beyond a lateral side of the first soil engaging part.

In one embodiment, the at least one laterally extending soil engagement member is substantially elongate.

In one embodiment, the at least one laterally extending soil engagement member is removably received by an aperture (e.g., bolt hole) in the first soil engaging part.

In one embodiment, the at least one laterally extending soil engagement member is connected (e.g., welded) to the first soil engaging part (e.g., to an underside thereof).

In one embodiment, the soil opener is a soil opener in accordance with any embodiment of the third aspect of this disclosure.

BRIEF DESCRIPTION OF THE DRAWINGS

An embodiment of this disclosure will now be described by way of example with reference to the accompanying drawings in which.

DETAILED DESCRIPTION

Figure 1:
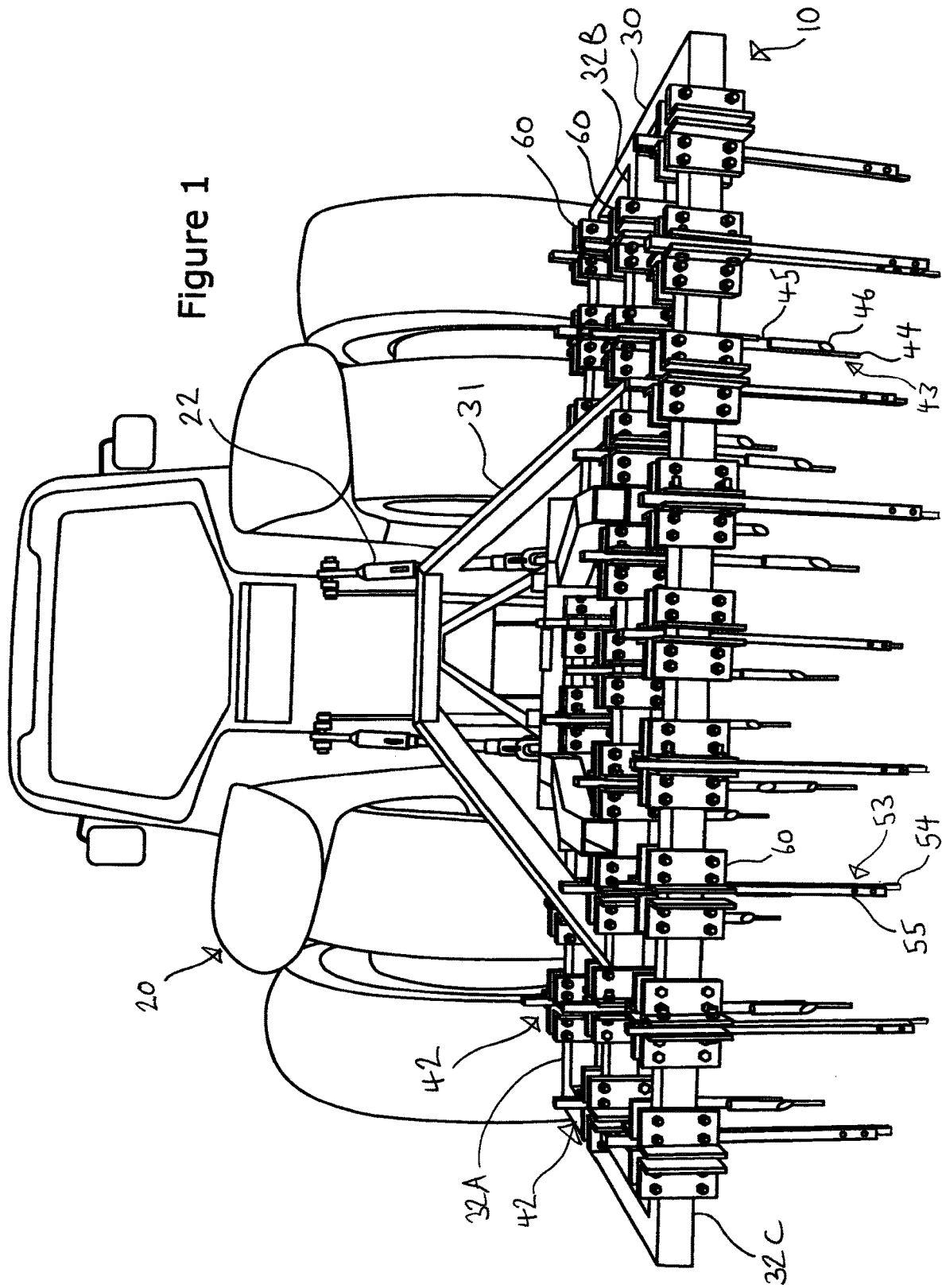
FIG. 1 is a schematic perspective rear view of a seed drill device in accordance with an embodiment of this disclosure shown mounted to a rear of a tractor.
Figure 2:
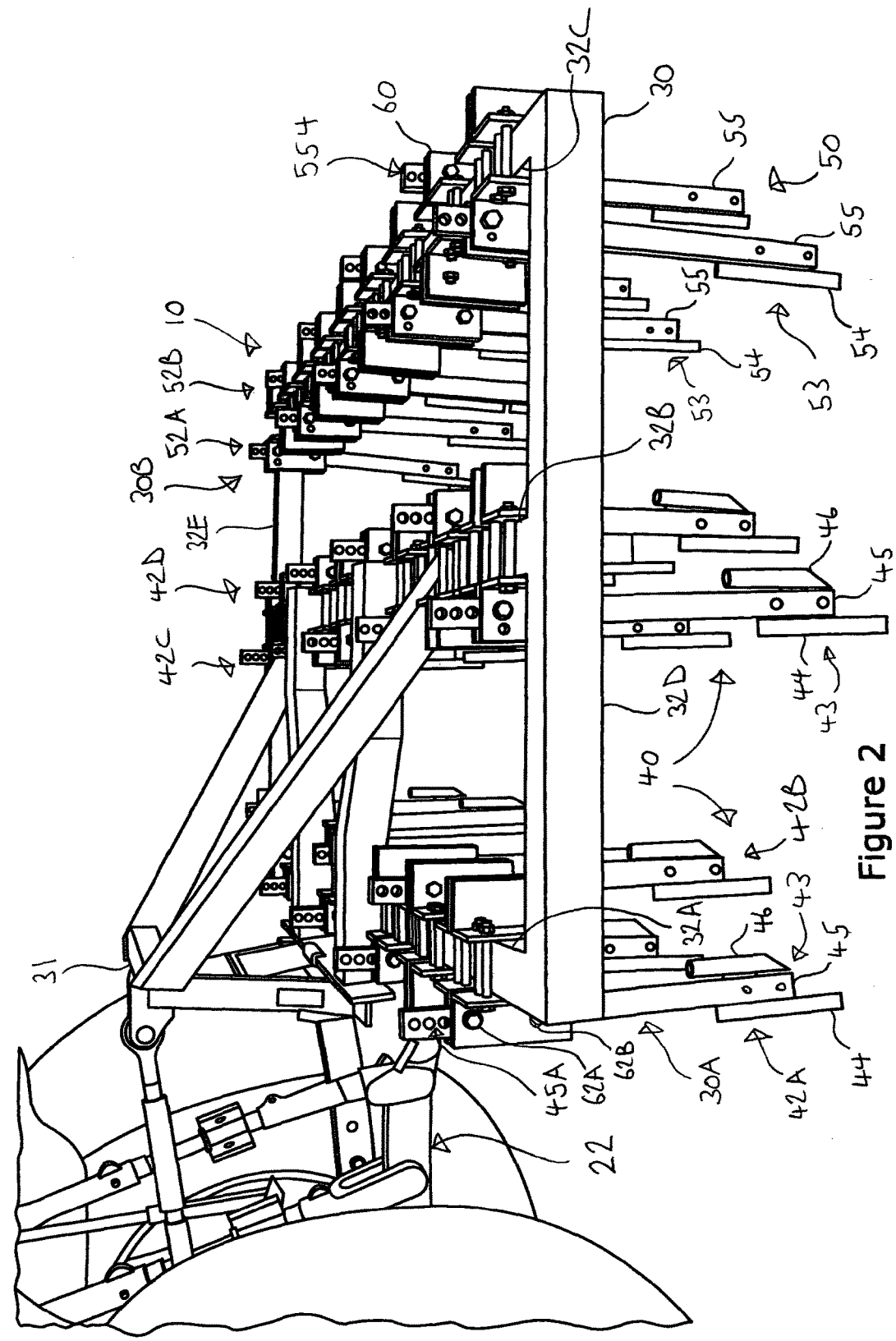
FIG. 2 is a schematic perspective side view of the seed drill device of FIG. 1.

FIGS. 1 and 2 show a seed drill device 10 for mounting to a tractor 20 equipped with a rear three-point linkage system 22.

Seed drill device 10 comprises a frame 30 defining a leading part 30A supporting a soil opening stage 40, a trailing part 30B supporting a soil closing stage 50 spaced rearward from the soil opening stage 40 and a tractor connector assembly 31. As illustrated most clearly in FIG. 3, frame 30 includes a laterally extending front bar 32A, a laterally extending center bar 32B and a laterally extending rear bar 32C, each connected at opposed lateral ends to longitudinally extending side bars 32D, 32E.

Figure 4:
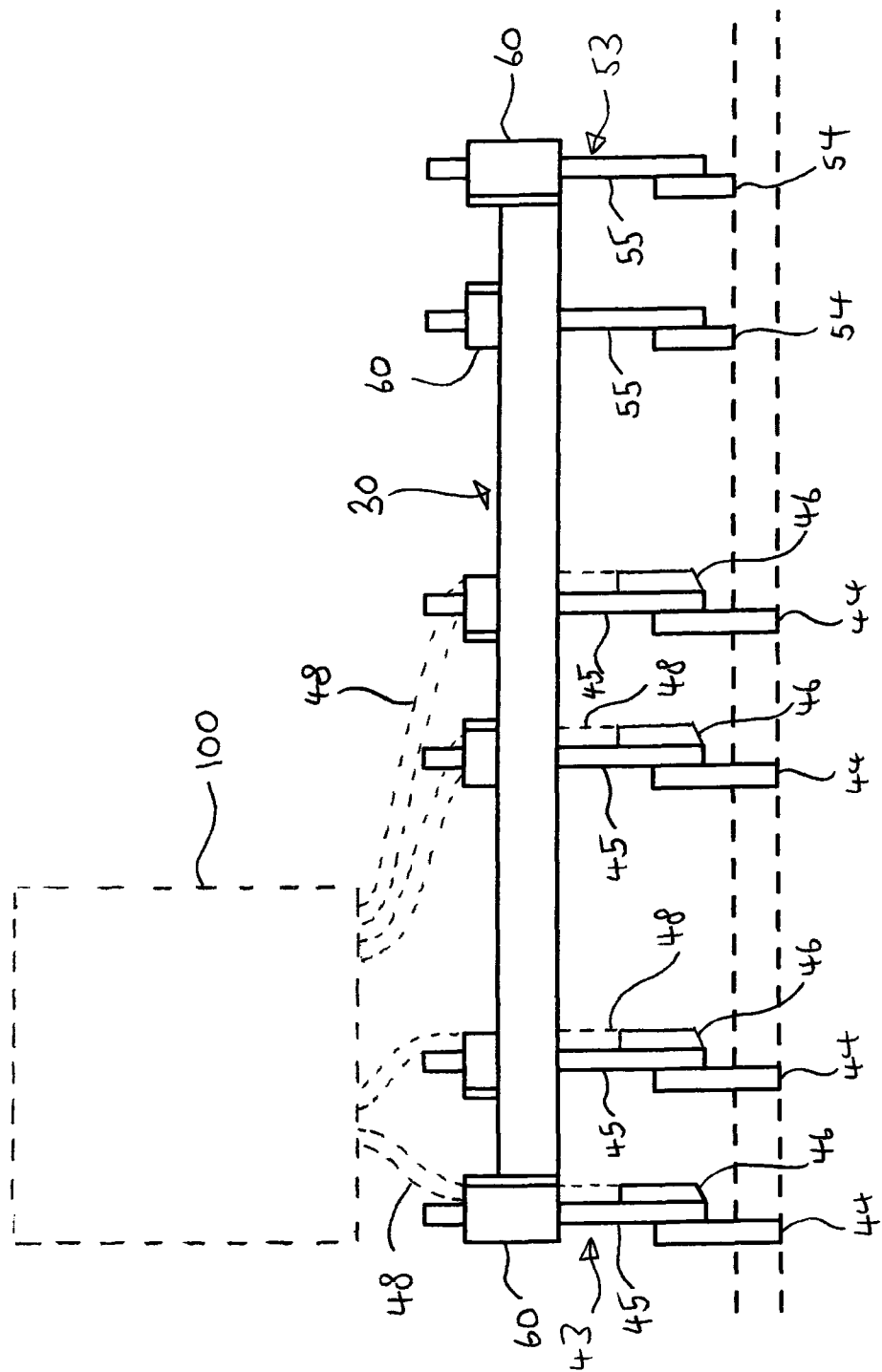
FIG. 4 is a schematic side view of the frame of seed drill device of FIG. 1.

Soil opening stage 40 comprises a plurality of rows 42A-D of laterally spaced seeding units 42 each comprising a soil opening tine 43 comprising a blade 44 mounted on a blade support tine 45 and associated with a respective seed delivery outlet 46 (also mounted on blade support tine 45) and connected in a conventional manner via a flexible hose 48 to a metered seed source 100 (for simplicity shown in FIG. 4 only). As illustrated, rows 42A and 42B are respectively provided on the front and rear of front bar 32A of frame 30 whilst rows 42C and 42D are respectively provided on the front and rear of center bar 32B of frame 30.

Soil closing stage 50 comprises a plurality of rows 52A, 52B of laterally spaced trailing soil opening tines 53 (each comprising a blade 54 mounted on a blade support tine 55) each associated with a respective pair of seeding units 42. As illustrated, rows 52A and 52B are respectively provided on the front and rear of rear bar 42C.

This staggered arrangement of seeding units 42 and trailing soil opening tines 53 is configured to utilize space on the frame as efficiently as possible whilst minimizing unwanted interference between neighboring seeding units 42/neighboring tines 53.

Each of the soil opening blades 44, 54 are held in position by means of support brackets 60 bolted to frame 30 which in turn are connected to blade support tines 45, 55 via pairs of bolts 62A, 62B. Independent height adjustment of soil opening blades 44, 54 relative to frame 30 is achieved by relocating pairs of bolts 62A, 62B to a different pair of a series of apertures 45A, 55A (See FIG. 15) formed in an upper section of blade support tines 45, 55.

Figure 3:
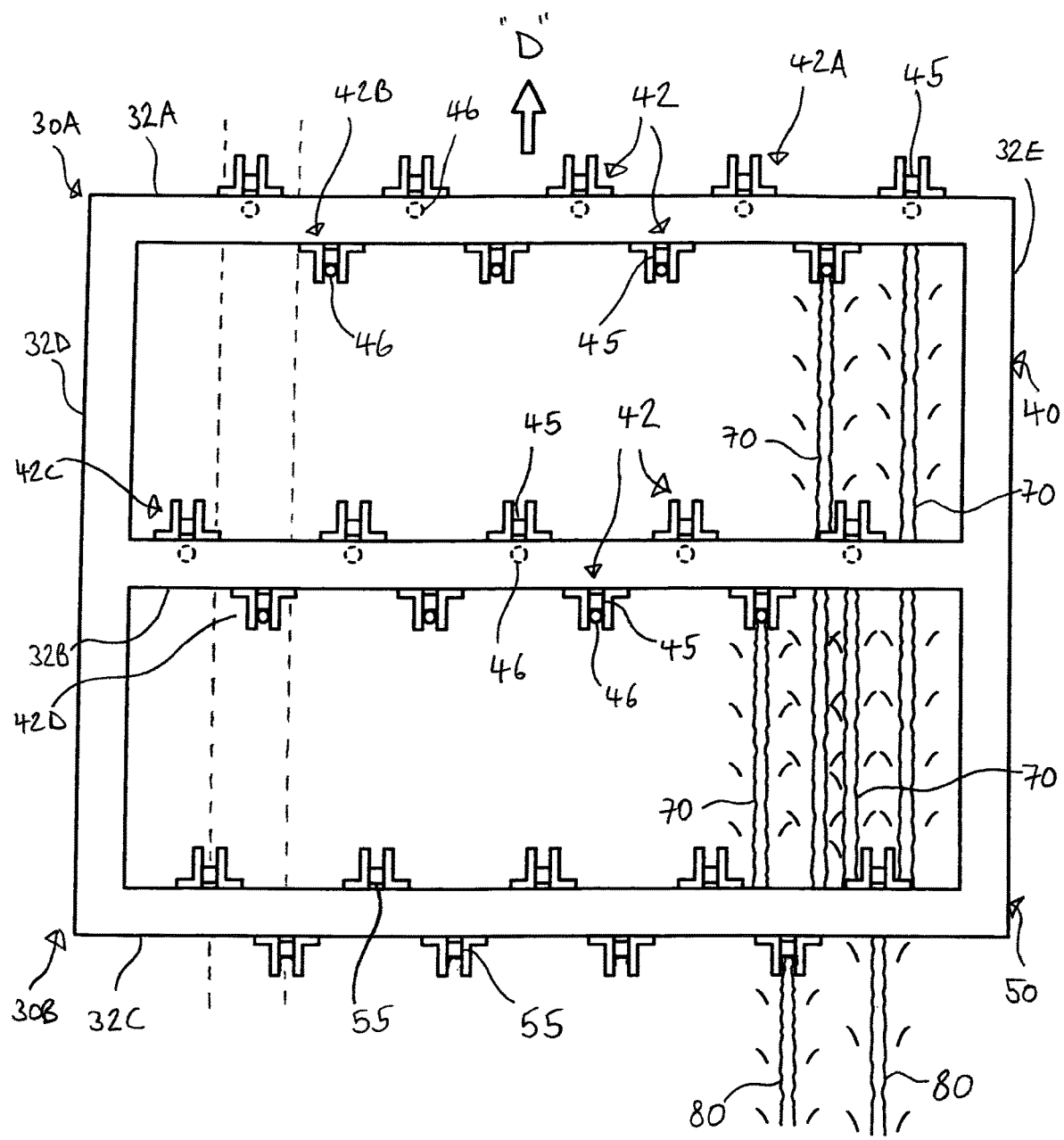
FIG. 3 is a schematic plan view of the frame of the seed drill device of FIG. 1 illustrating operation of the device in use.

As illustrated in FIG. 3, each soil opening tine 43 of the plurality of seeding units 42 is configured to form in combination with its associated seed delivery outlet 46 a respective seeded trench 70 in the ground when seed drill device 10 is driven through soil in a forward direction of travel "D." In contrast, each trailing soil opening tine 53 (which is not associated with a seed delivery outlet as it is part of the trailing soil closing stage 50) is configured to form a seedless trench 80 between and laterally spaced from the seeded trenches 70 of each respective pair of seeding units 42. In accordance with the technique of this disclosure, the spacing of the laterally spaced seeded trenches 70 and seedless trenches 80 is selected to be close enough to enable soil displaced during the formation of seedless trenches 80 to be directed as part of the natural trench-forming action toward the neighboring seeded trench 70 whereby seeded trenches 70 are substantially covered by soil lifted and displaced laterally by trailing soil opening tines 53.

As illustrated in FIG. 4, the depth of soil opening blades 44 relative to trailing soil opening blades 54 may be set so that the trailing soil opening blades 54 are set to a shallower depth relative to their blade support tines 55 than soil opening blades 44. The precise relationship between the depth of blades 44 and 54 may depend upon soil conditions. Additional control including may be achieved by varying the position of blade support tines 45, 55 relative to frame 30 or by varying the orientation of frame 30 relative to tractor 20 by lowering, raising or pivoting frame 30 via rear three-point linkage system 22.

In the specific illustrated example, frame 30 is 3 m wide there are eighteen soil opening tines 43 and nine trailing soil opening tines 53 (it is noted that these trailing soil opening tines 53 may be referred to as "soil closing" tines by virtue of their operation to close seeded trenches 70). Blade support tines 45, 55 are 25 mm wide by 70 mm deep by 750 mm high. Each blade 44, 54 is formed by a 10 mm stainless steel cutting blade (e.g., tungsten Ferobide™ steel) welded on the front of the tine support. A length of blade around 100 mm long protrudes from blade support tines 45. In contrast, the length of blade protruding from blade support tines 55 is typically much smaller, say 30-60 mm in length (trailing soil opening blades 54 are mounted further up the leg with less over hang so that blade support tines 55 can be put deeper into the ground to achieve a greater deflection of soil toward the seeded trenches 70). Blade support tines 45, 55 are largely protected from soil abrasion as soil flows off blades 44, 54 and around blade support tines 45, 55. Blade support tines 45 are spaced (in a staggered four line formation using front and back mountings on the two front frame beams). Tines blades 44 are laterally spaced by a distance of around 145 mm. Tines blades 54 sit substantially equidistant between each pair of tines blades 44, thus around 72.5 mm away. Typically this is close enough to flow the soil back onto the seeded trench 70 thereby closing the seeded trench securely around the deposited seed without unduly inverting the soil.

Optional depth control wheels (not shown) may be fitted at the rear of frame 30. In the case that the drill device includes depth control wheels, the device may be configured to allow the depth control wheels to be taken off to allow drilling in very sticky conditions. If large tractor-type tires are used to provide depth control (say 2×1 m diameter rubber tractor tires) then almost no wet soil will stick to the flexing tire. Then the front soil opening tines 43 of the drill can be altered for depth simply by lowering the draught depth by lowering or raising the three point linkage on the tractor. The depth of trailing soil opening tines 53 would be changed by a smaller degree since they are closer to the fulcrum provided by the large rear wheels. If additional depth adjustment is needed at the rear then the rear depth control tires can be deflated slightly or blade support tines 55 can be lowered using the bolt hole adjustments.

Whilst it is conceivable that some form of soil levelling device may be included as part of the seed drill device 10 (e.g., for use in dry conditions or light soil), in the embodiment as illustrated the seed drill device 10 is without any form of soil levelling device (e.g., it is a rollerless device with only soil opening tines 43 and trailing soil opening tines 53 and any optional depth control wheels spaced from the trenches making contact with the ground). Accordingly, a field processed by seed drill device 10 will be left with a series of open seedless trenches 80. Advantageously, these open seedless trenches 80 may in one embodiment be used to depositing a pest control composition (e.g., slug pellets or the like). Typically the pest control composition is deposited by a pest control composition delivery device provided on seed drill device 10 (e.g., with the depositing step occurring as the seedless soil displacement trench 80 is formed in a manner similar to the depositing of seeds into trenches 70). Furthermore, the seed drill device 10 may alleviate frost heave (when the ground surface freezes and it expands and rises up like an arch over the roots of the seedlings thus snapping the leaves off the roots, a common problem with fine seed beds) since advantageously the open seedless trenches may act as expansion joints.

Whilst the seed drill device 10 of this disclosure is intended for direct drilling in all soil types, the device will additionally drill in ploughed or cultivated soils. Advantageously the drill device of this disclosure drills equally well or better in the worst drilling conditions because it uses the fluid movement of soil flow rather than disruption of the soil allowing the drill to work in heavy wet clay where no conventional drill can drill. Accordingly, whereas the limitations of conventional drills require drilling to be carried out early in the dry part of the season before weeds such as black grass have germinated (which is a major problem since currently the only way to kill resistant black grass is to germinate it on the field and then spray it with weed killer prior to drilling the actual crop), the seed drill of this disclosure allows the farmer to leave the drilling until late in the autumn and confidently expect to drill all his crops after the previous crop weeds have been germinated and sprayed off but still within the optimal yield drilling date range.

In summary, the seed drill device 10 of this disclosure may advantageously be suitable for drilling all seed sizes, at all depths, in all soil types and in all conditions.

Figure 5:
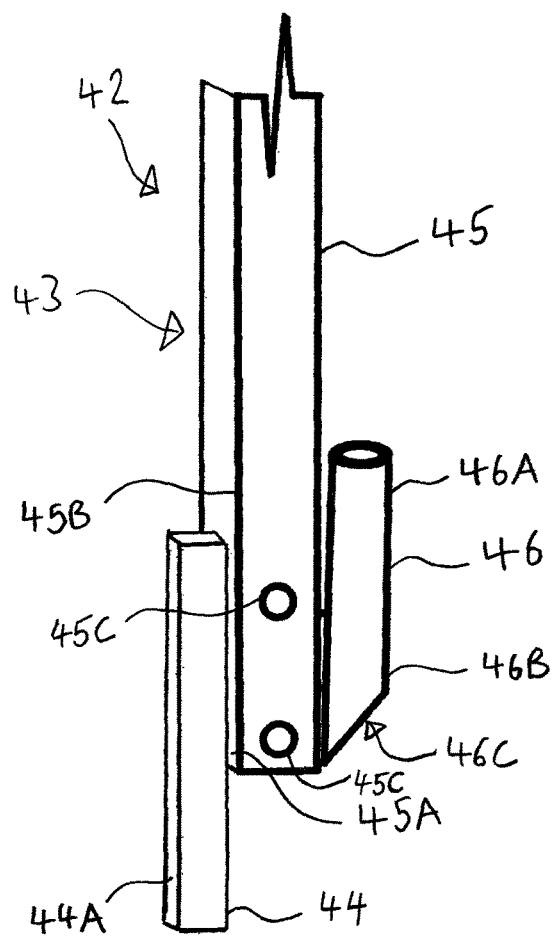
FIG. 5 is a schematic side view of a soil opener of the seed drill device of FIG. 1.

As illustrated in FIG. 5, each seeding unit 42 comprises a soil opening tine 43 comprising a soil opening blade 44 defining a leading forward facing soil engagement surface 44A and a blade support tine 45 defining a trailing forward facing soil engagement surface 45A with chamfered edges 45B. Each seed delivery outlet 46 is mounted on the rear of its respective blade support tine 45.

Seed delivery outlet 46 comprises an upper tubular body section 46A for connection to a seed delivery hose and a compressed lower body section 46B defining an inclined exit aperture 46C for releasing seed. In the case of a soil closing unit, seed delivery outlet 46 would be omitted.

In this embodiment, seed delivery outlet 46 is formed from a length of steel tubing having an end that is first cut at angle to form the inclined exit aperture 46C and then compressed (e.g., in a vice) to form an end section with a flattened tubular form. Seed delivery outlet 46 is then welded to the rear of blade support tine 45. The narrowing of the tube at the exit aperture 46C assists in reducing abrasion and allows the exit aperture 46C to be mounted in a preferred orientation whilst upper tubular body section 46A sits proud of blade support tine 45 to allow space for a seed hopper hose to be fitted around upper body section. The arrangement of the tube coming to the end of the blade support tine 45 and the soil opening blade 44 mounted on the front has been found to provide an advantage in cost, simplicity and seed delivery to the correct depth.

Typically seed delivery outlet 46 has a width when viewed in the direction of travel that is less than a corresponding width of blade support tine 45 so that seed delivery outlet 46 is concealed from view when seeding unit 42 is viewed from the front.

Seed delivery outlet 46 is typically of a size that can take all sized seeds from oilseed rape to beans. The front edges of the blade support tines 45 are typically chamfered to reduce soil interruption at front of tine. Each blade 44 must typically be narrow enough to keep soil interruption to a minimum but strong enough to put a slot (typically around 4 inches) beneath the seed for air and drainage and rooting provisions.

Figures 6A, 6B:
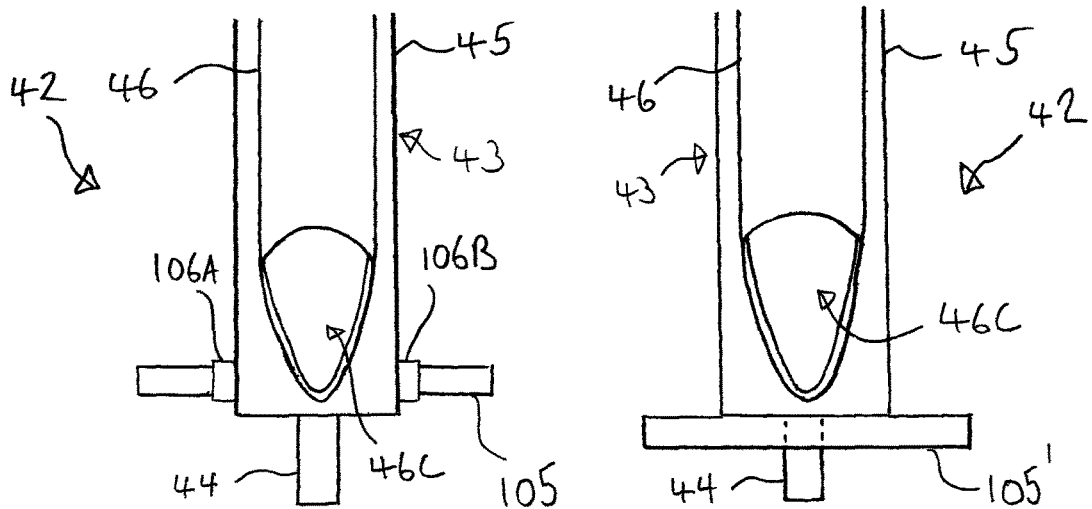
FIG. 6A is a schematic rear view of the soil opener of FIG. 5 in a first configuration.
FIG. 6B is a schematic rear view of the soil opener of FIG. 5 is a second configuration.

As show in FIG. 5, blade support tine 45 additionally includes upper and lower bolt holes 45C configured to receive a bolt 105 there through (the bolt being held in place by nuts 106A, 106B) to form optional side tines as shown in FIG. 6A. Alternatively, optional side tines may be formed by permanently welding a bar 105' to an underside of blade support tine 45 as illustrated in FIG. 6B. These side tines, which may equally be formed on trailing blade support tines 55, may act to increase ground heave and interruption deeper in the soil.

Figure 7:
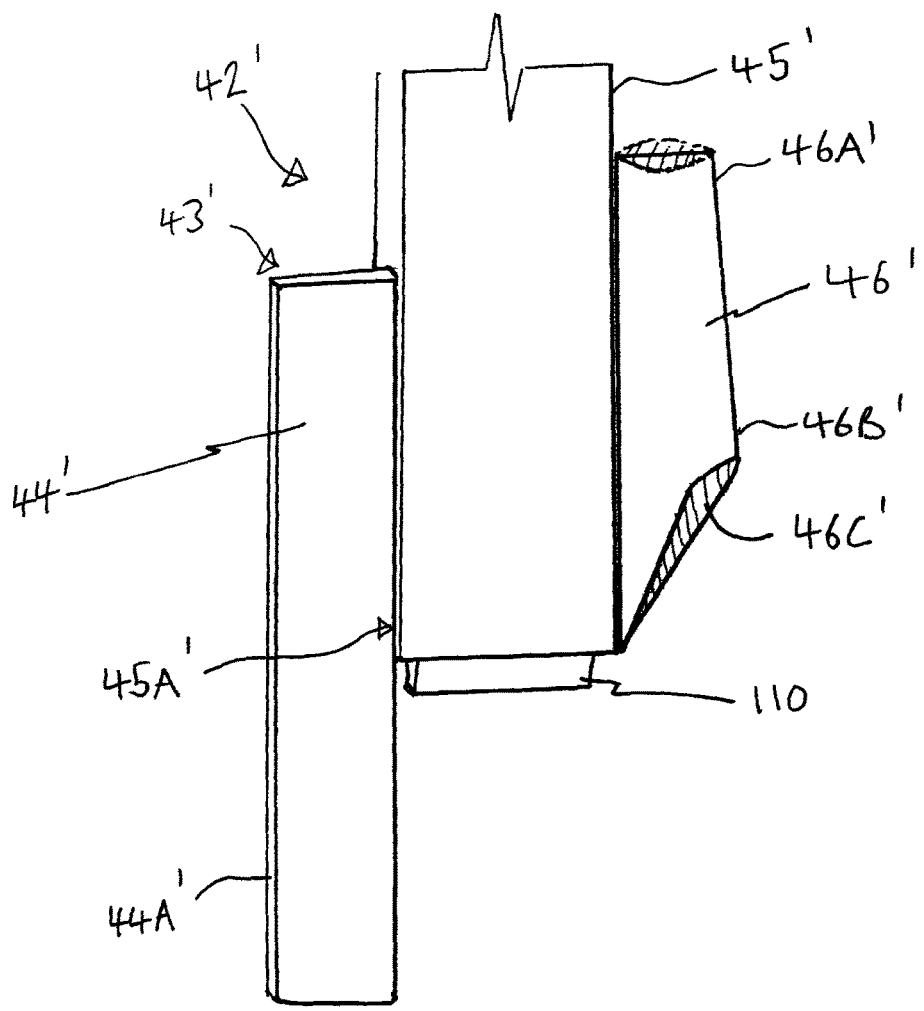
FIG. 7 is a schematic perspective side view of an alternative soil opener including a soil displacement member for use in the seed drill device of FIG. 1.
Figure 7A:
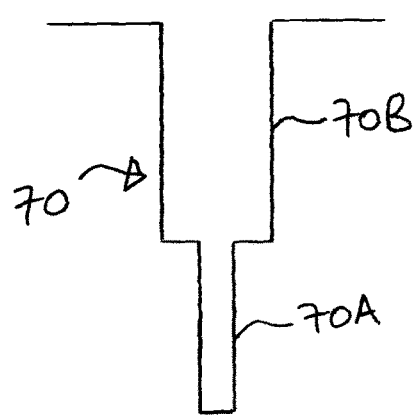
FIGS. 7A and 7B are schematic views of trenches formed by the soil opener of FIG. 7 with and without the soil displacement member.

As illustrated in FIG. 7A, each seeded trench 70 formed by seeding unit 42 comprises a leading trench part 70A (deep rooting trench) formed by leading soil opening blade 44 and a main trench portion 70B formed by trailing blade support tine 45. As soil opening blade 44 projects further into the ground leading trench portion 70A is deeper than main trench portion 70B. This two stage width opening allows for strength down the tine length but narrows to 10 mm at the blade to form a soil opening tine that is both narrow enough and strong enough over a long enough leg so that straw, soil, etc., can pass easily under the frame without blocking up.

As illustrated, the wider blade support tine 45 being flush with seed delivery depth leaves a small "seed terrace" above the leading trench part 70A giving the correct drilling depth which can be varied by adjusting the legs or the machines depth adjustments or the tractors hydraulics to place seed in the ground up to 6 inches deep for maize, 4 inches for beans, 2 inches for cereals or 1 inch for oilseed rape and other small seeds.

FIG. 7 shows an alternative seeding unit 42' for use in seed drill device 10 comprising a soil opening tine 43' with a soil opening blade 44' defining a leading forward facing soil engagement surface 44A' mounted to the front of a blade support tine 45' which defines a trailing forward facing soil engagement surface 45A'. An associated seed delivery outlet 46' is mounted on the rear of blade support tine 45'. Seed delivery outlet 46' comprises an upper tubular body section 46A' for connection to a seed delivery hose and a compressed lower body section 46B' defining an inclined exit aperture 46C' for releasing seed. In the case of a soil closing unit, seed delivery outlet 46' would be omitted. Seeding unit 42' differs from seeding unit 42 by further comprising a soil displacement blade member 110 mounted on an underside of blade support tine 45'. In this embodiment, soil displacement blade member 110 is inclined relative to vertical so as to encourage soil deflection in one particular direction.

Figure 7B:
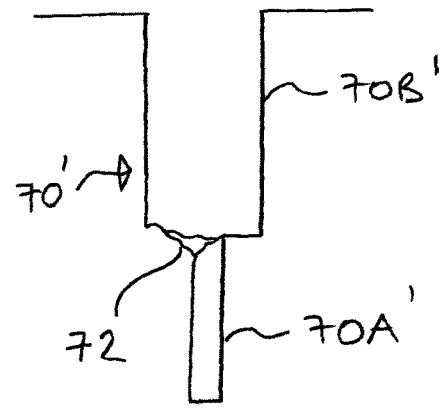

As illustrated in FIG. 7B, soil displacement blade member 110 acts to deflect soil toward a leading trench part 70A' of trench 70 formed by soil opening blade 44' in order to form a bridge of soil 72 to cover the leading trench part 70A'. Advantageously, the soil deflection action of soil displacement blade member 110 may help to prevent small seeds such as oilseed rape from falling into the leading trench 70A' which may be too deep for optimal growth.

Figure 8:
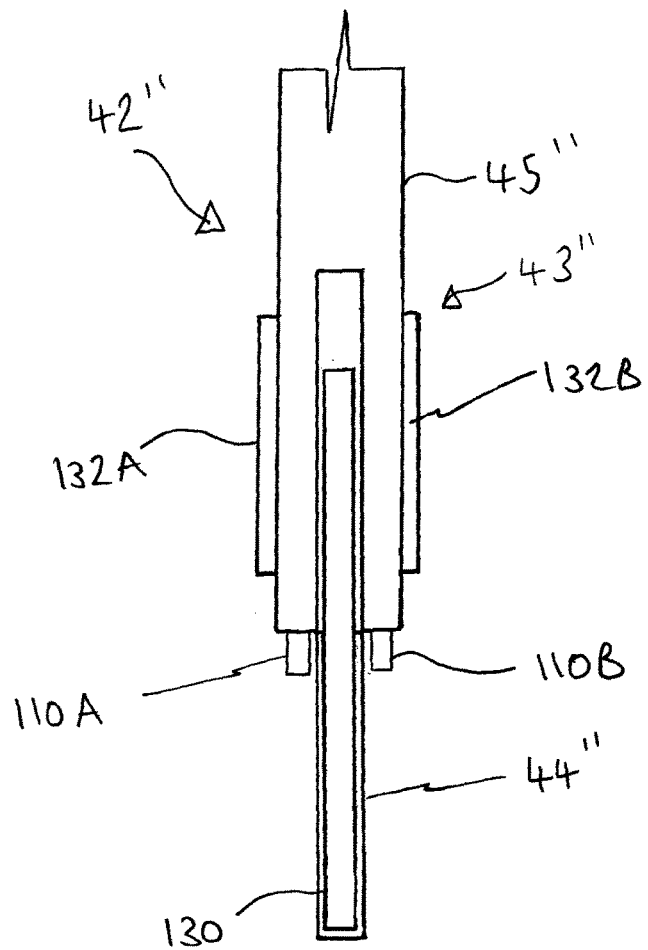
FIG. 8 is a schematic front view of a further soil opener in accordance with another embodiment of this disclosure for use in the seed drill device of FIG. 1.
Figure 9:
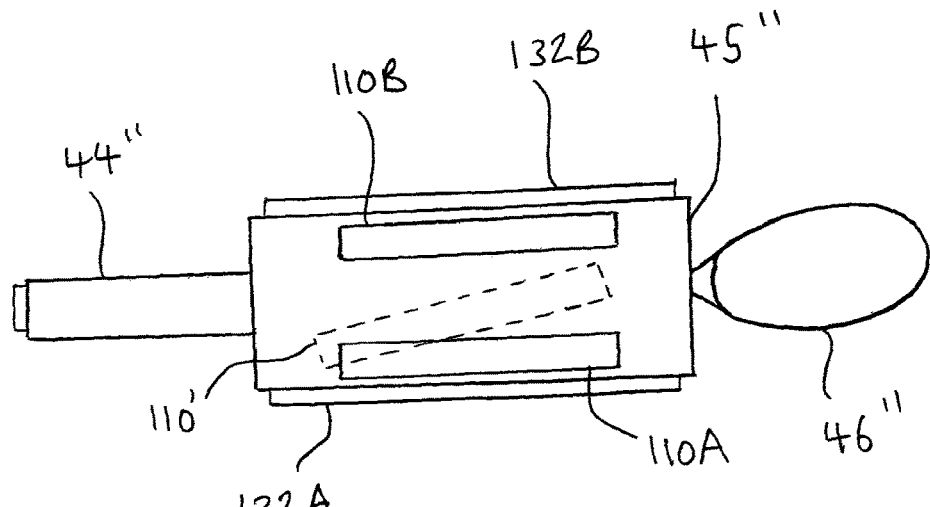
FIG. 9 is a schematic underside view of the soil opener of FIG. 8.

FIGS. 8 and 9 show a yet further alternative seeding unit 42" for use in seed drill device 10 comprising a soil opening tine 43" including a soil opening blade 44" mounted to the front of a blade support tine 45" and an associated seed delivery outlet 46" mounted on the rear of blade support tine 45". Seed delivery outlet 46" comprises an upper tubular body section 46A" for connection to a seed delivery hose and a compressed lower body section 46B" defining an inclined exit aperture 46C" for releasing seed. In the case of a soil closing unit, seed delivery outlet 46" would be omitted. Seeding unit 42" differs from seeding unit 42' by further comprising a pair of laterally spaced soil displacement blade members 110A, 110B mounted on an underside of blade support tine 45" on opposed lateral sides of soil opening blade 44".

As illustrated, each soil deflection blade member 110A, 110B is substantially aligned with the forward direction and laterally spaced from soil opening blade 44" (e.g., with a gap being visible therebetween when viewed from the front). Alternatively, one or more of the soil deflection blades may be replaced by a laterally inclined soil deflection blade 110' as illustrated in FIG. 9 in order to increase soil deflection.

Seeding unit 42" additionally comprises a wear-resistant front plate 130 welded to leading forward facing soil engagement surface 44A" of soil opening blade 44" and wear-resistant side plates 132A, 132B welded to lateral side faces of blade support tine 45". Wear-resistant plates 130, 132A, 132B may be formed from a tungsten carbide composite material such as Ferobide™ manufactured by Tenmat Ltd, Manchester, United Kingdom.

Figure 10:
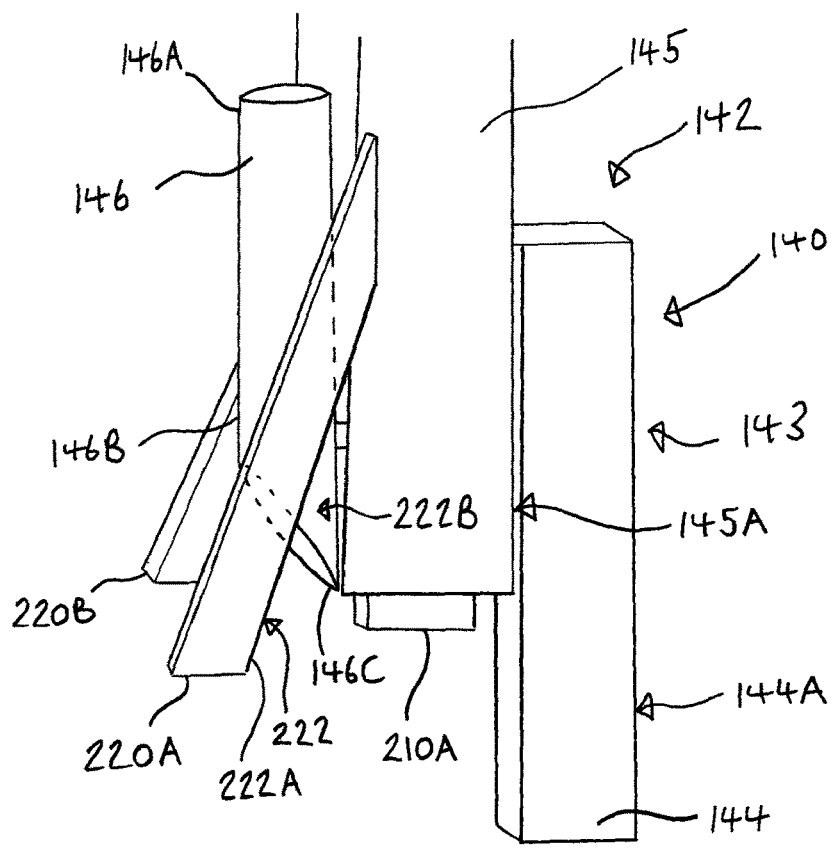
FIG. 10 is a schematic perspective side view of a combined soil opener/soil closer in accordance with a further embodiment of this disclosure.
Figure 11:
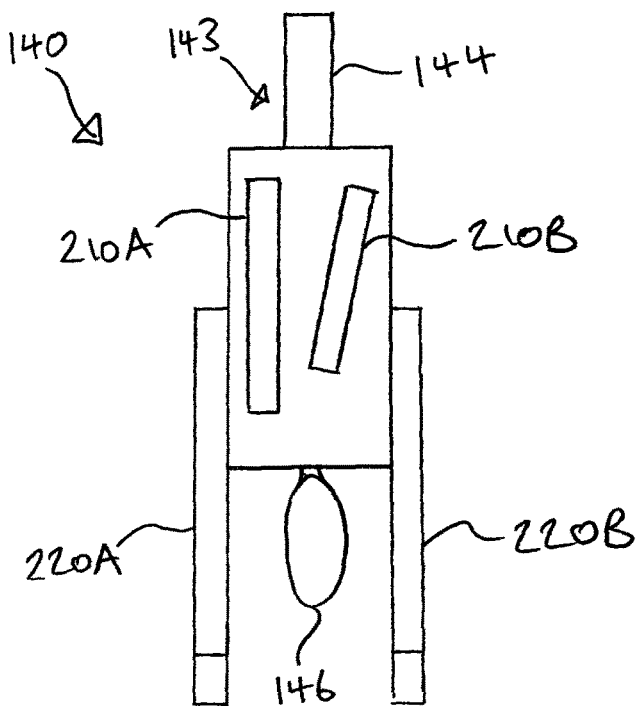
FIG. 11 is a schematic underside view of the combined soil opener/soil closer of FIG. 10.
Figure 12:
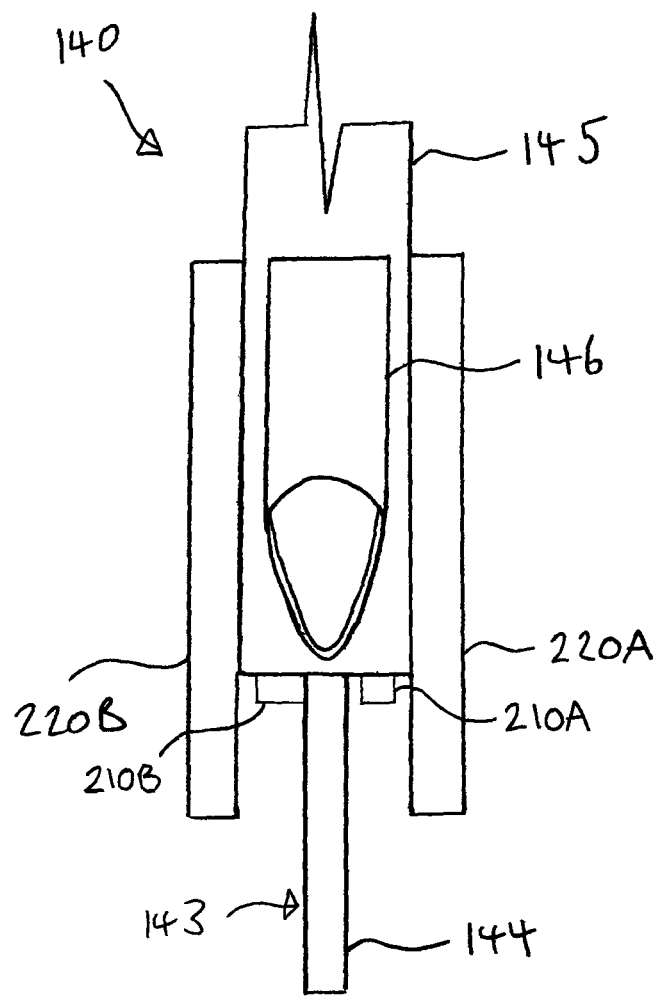
FIG. 12 is a schematic rear view of the combined soil opener/soil closer of FIG. 10.

FIGS. 10-12 show a combined soil opener/soil closer 140 for use in an alternative seed drill device to the device of FIGS. 1-4. Combined soil opener/soil closer 140 comprises a seeding unit 142 comprising a soil opening tine 143 comprising a soil opening blade 144 defining a leading forward facing soil engagement surface 144A and a blade support tine 145 defining a trailing forward facing soil engagement surface 145A. A seed delivery outlet 146 comprising an upper tubular body section 146A for connection to a seed delivery hose and a compressed lower body section 146B defining an inclined exit aperture 146C for releasing seed is mounted to the rear of blade support tine 145.

Combined soil opener/soil closer 140 further comprises: a pair of laterally spaced soil displacement blade members 210A, 210B welded on an underside of blade support tine 145 and configured to deflect soil toward a leading trench part formed by soil opening blade 144 in order to cover the leading trench part; and a pair of laterally spaced trailing soil closing blade members 220A, 220B welded to lateral sides of blade support tine 145 configured to deflect soil toward a main seed trench formed by blade support tine 145.

As illustrated in FIG. 10, each trailing soil closing blade member 220A, 220B is swept rearward to define a forward facing soil closing engagement surface 222 inclined relative to horizontal and having a bottom portion 222A positioned rearward of at least a leading portion of the exit aperture 146C with a soil flow gap 222B being formed between each trailing soil closing blade member and blade support tine 145. In this way, the soil closing action provided by the trailing soil closing blade members 220A, 220B will act to close the main seed trench after the depositing of seed via the seed delivery outlet 146.

As shown in FIG. 11, soil deflection blade member 210A is substantially aligned with the forward direction and laterally spaced from soil opening blade 144. In contrast, soil deflection blade member 210B is laterally inclined in order to provide increased soil deflection in one direction.

Advantageously, the combined soil opener/soil closer 140 both opens and closes the soil during seed delivery thereby potentially obviating the need for a subsequent soil closing stage.

Figure 13A:
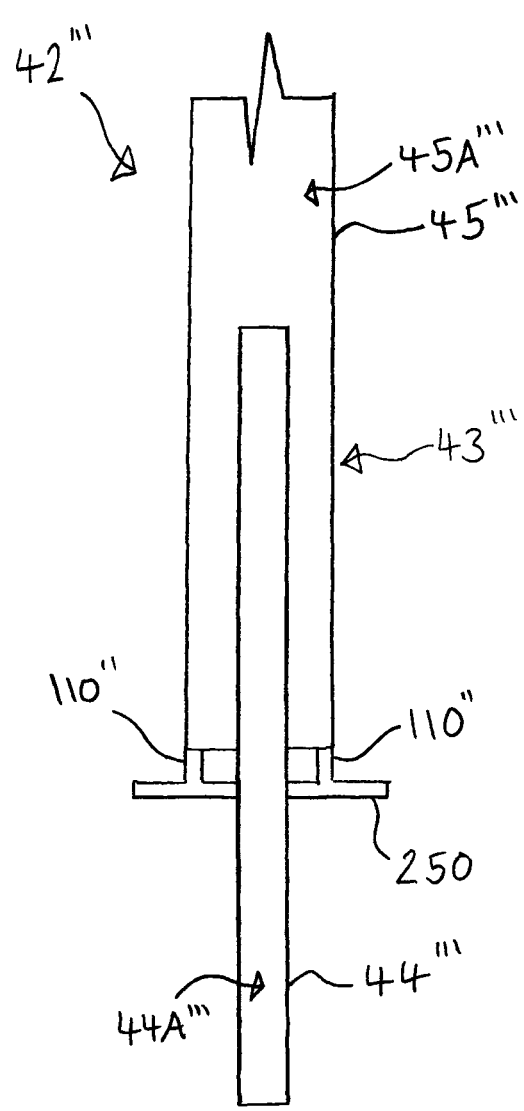
FIG. 13A is a schematic front view of a soil opener including a soil displacement member in accordance with a yet further embodiment for use in the seed drill device of FIG. 1.
Figure 13B:
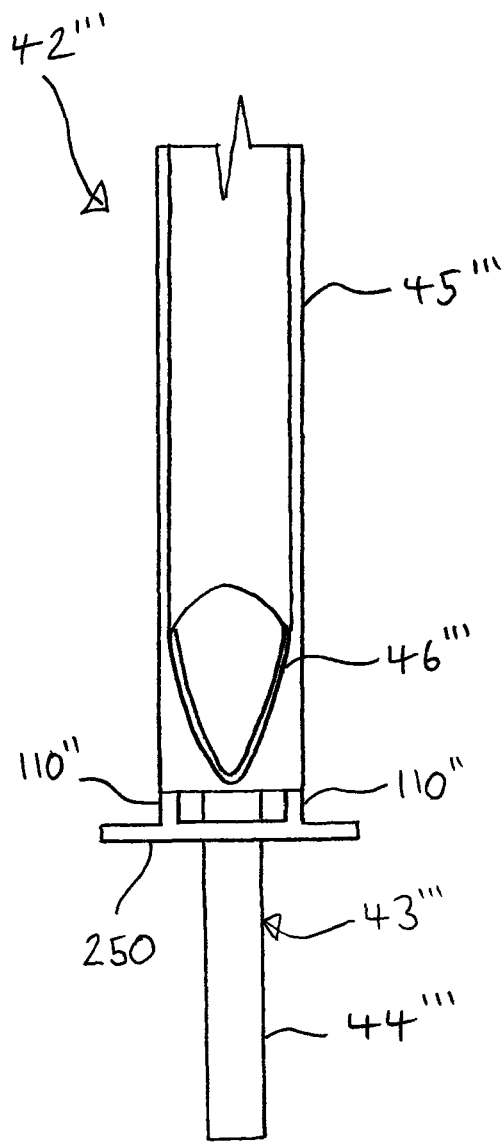
FIG. 13B is a schematic rear view of the soil opener of FIG. 13A.
Figure 13C:
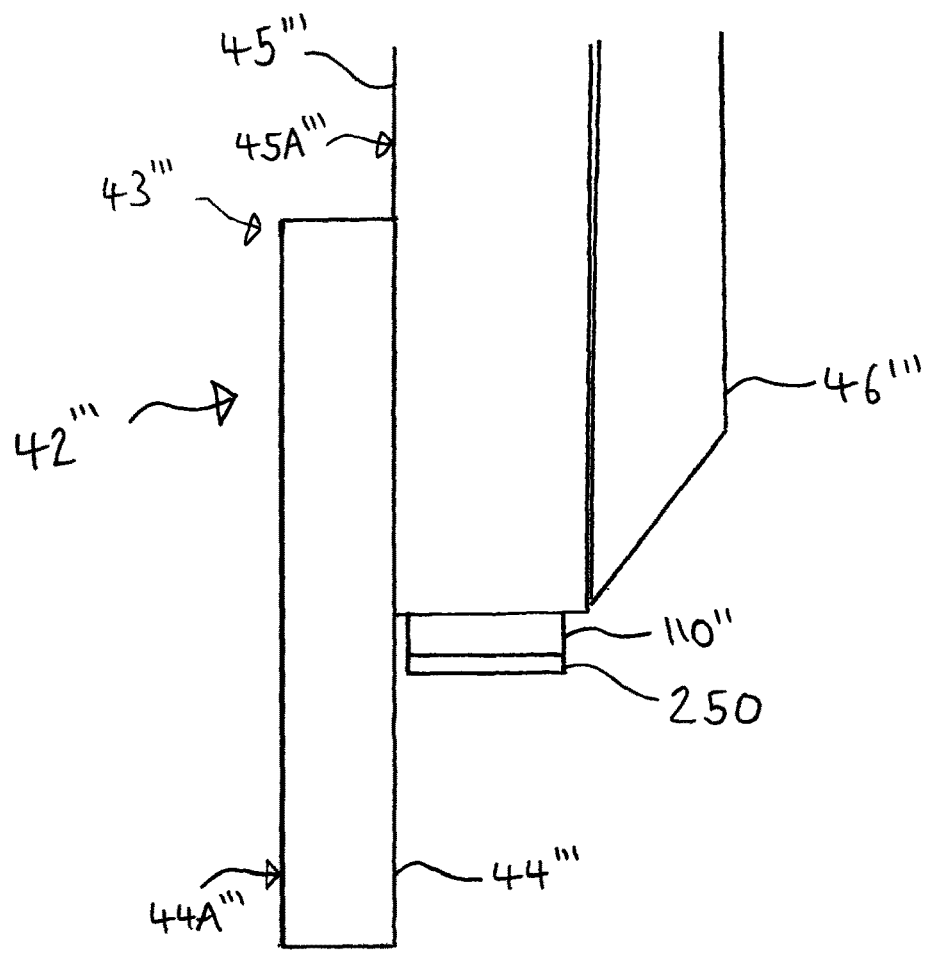
FIG. 13C is a schematic side view of the soil opener of FIG. 13A.

FIGS. 13A-C show an alternative seeding unit 42''' for use in seed drill device 10 comprising a soil opening tine 43''' including a soil opening blade 44''' defining a leading forward facing soil engagement surface 44A''' mounted to the front of a blade support tine 45''' which defines a trailing forward facing soil engagement surface 45A'''. An associated seed delivery outlet 46''' is mounted on the rear of blade support tine 45'''. Seed delivery outlet 46''' comprises an upper tubular body section 46A''' for connection to a seed delivery hose and a compressed lower body section 46B''' defining an inclined exit aperture 46C''' for releasing seed. In the case of a soil closing unit, seed delivery outlet 46''' would be omitted. Seeding unit 42''' differs from seeding units 42 by further comprising a pair of laterally spaced soil displacement blade members 110" mounted on an underside of blade support tine 45''' and supporting a horizontal tine blade 250 extending laterally beyond lateral sides of blade support tine 45'''. The lateral spacing of soil displacement blade members 110' acts to form a flow aperture for allowing soil to flow between a central portion of horizontal tine blade 250 and the underside of blade support tine 45'''.

Figure 13D:
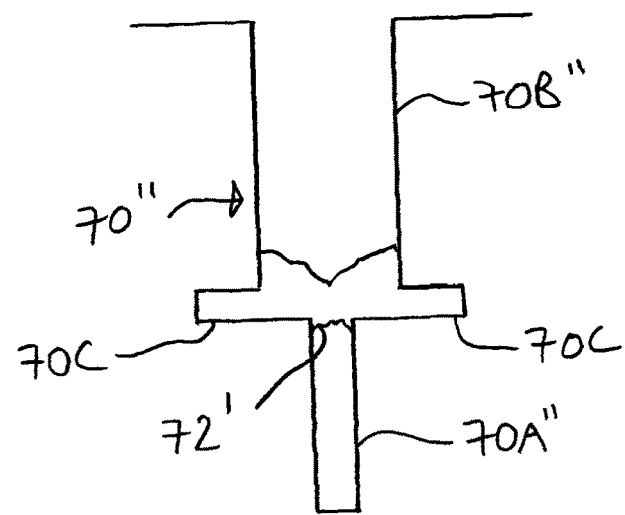
FIG. 13D is a schematic view of a trench formed by the soil opener of FIG. 13A.

As illustrated in FIG. 13D, soil displacement blade member 110''' acts to deflect soil toward a leading trench part 70A" of trench 70" formed by soil opening blade 44''' in order to form a bridge of soil 72' to cover the leading trench part 70A". At the same time, horizontal tine blade 250 acts to form laterally extending rooting corridors 70C in heavy clay soil for encouraging lateral rooting and opens up soil to improve rooting in all soil types.

Figure 14:
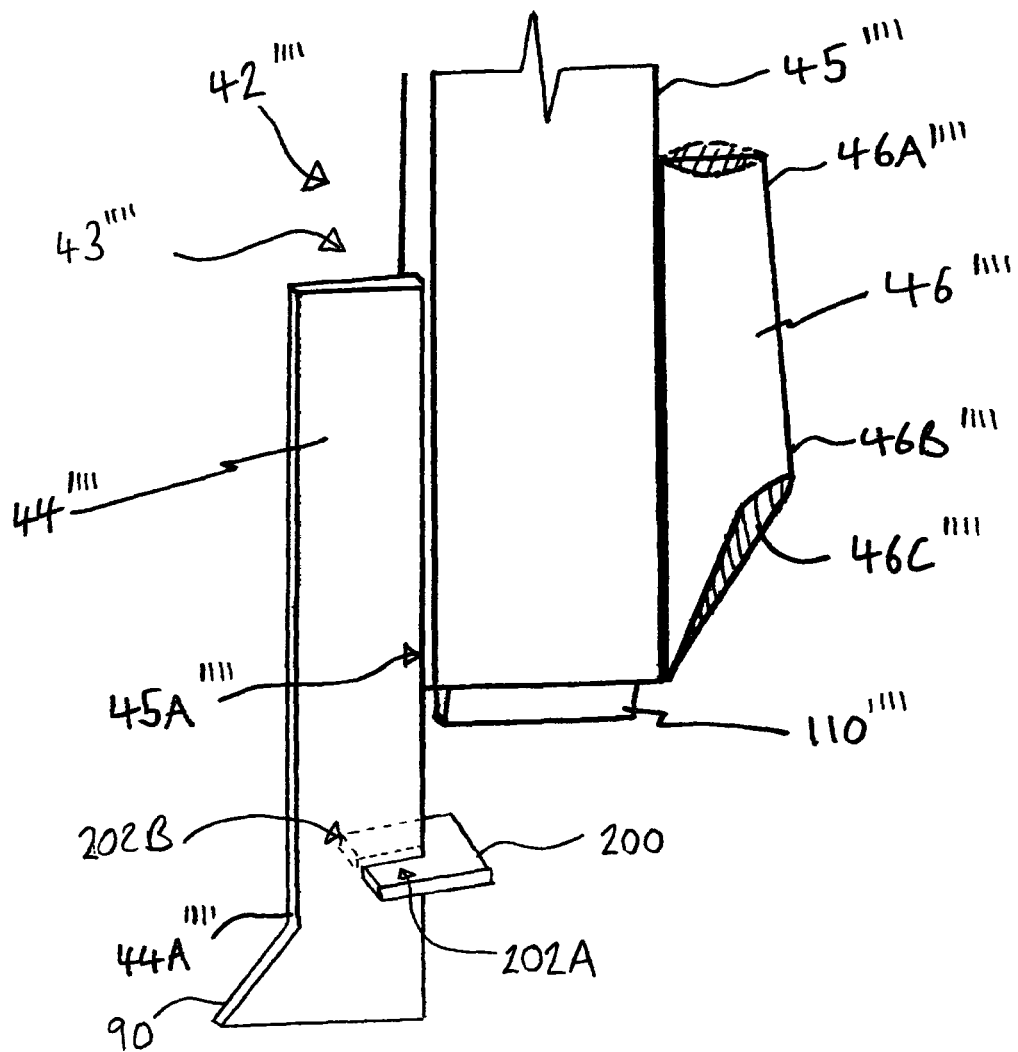
FIG. 14 is a schematic perspective side view of a yet further alternative soil opener including a blade-mounted soil displacement member for use in the seed drill device of FIG. 1.

FIG. 14 shows an alternative seeding unit 42"" for use in seed drill device 10 comprising a soil opening tine 43"" including a soil opening blade 44"" defining a leading forward facing soil engagement surface 44A"" mounted to the front of a blade support tine 45"" which defines a trailing forward facing soil engagement surface 45A"", and soil displacement blade member 110"" mounted on an underside of blade support tine 45"". An associated seed delivery outlet 46"" mounted on the rear of blade support tine 45"". Seed delivery outlet 46"" comprises an upper tubular body section 46A"" for connection to a seed delivery hose and a compressed lower body section 46B"" defining an inclined exit aperture 46C"" for releasing seed. In the case of a soil closing unit, seed delivery outlet 46"" would be omitted. Seeding unit 42"" differs from previously described units in that soil opening blade 44"" includes a pointed leading profile 90 at its base and by the inclusion of a soil lifting member (or "lifting wing") 200 defining a pair of laterally spaced, laterally extending soil lifting surfaces 202A, 202B operative to lift/assist breakup of the soil.

Figure 15:
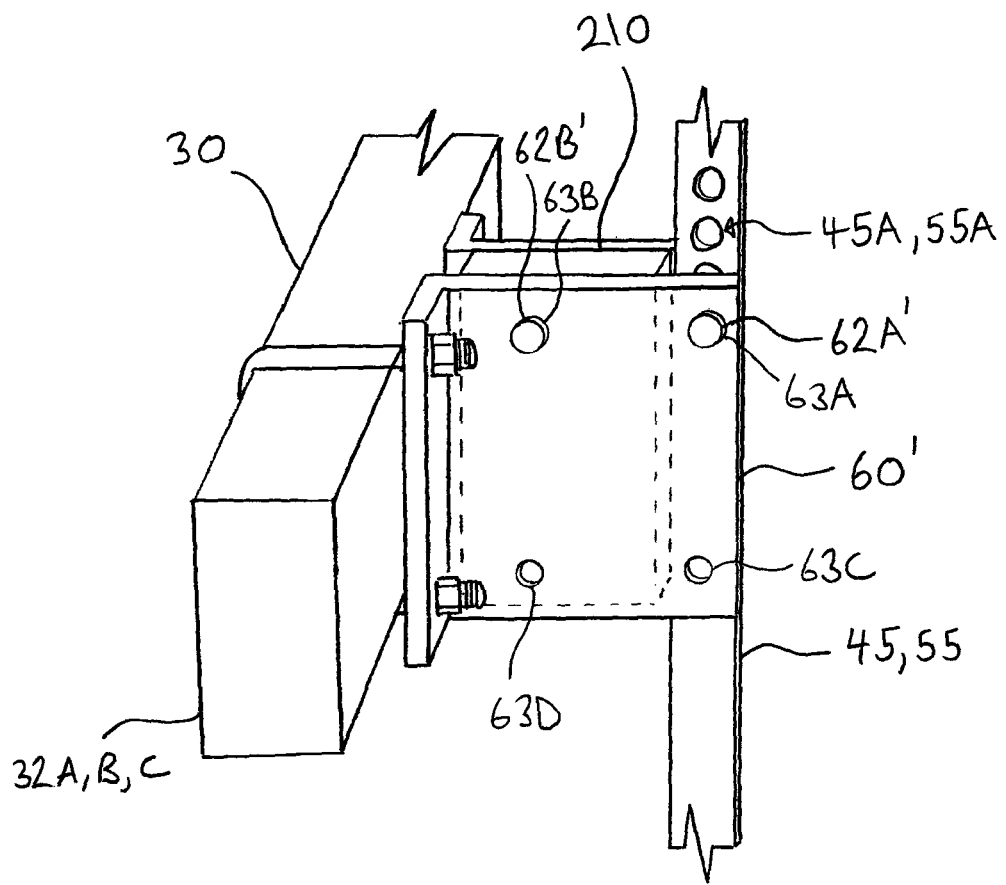
FIG. 15 is a schematic perspective view illustrating a technique for mounting blade support tines to the frame of the seed drill device of FIG. 1.

FIG. 15 illustrates a technique for mounting blade support tines 45, 55 to frame 30 of seed drill device 10 of FIG. 1 using a modified bracket 60' comprises a body formed by a pair of spaced plates and configured to receive a resilient rubber impact block 210 between the frame 30 and blade support tines 45, 55. As illustrated, blade support tines 45, 55 are bolted in position by a single bolt 62A' extending through an upper aperture 63A in bracket 60' and through an aperture 45A, 55A in blade support tines 45, 55. Similarly, rubber impact block 210 is bolted in position via a second upper aperture 63B by a single bolt 62B'. In use, this arrangement allows blade support tines 45, 55 to flex rubber impact block 210 in the event of an impact (e.g., striking of a stone) in order to protect blade support tines 45, 55 from breakage. Advantageously, the arrangement may be readily modified for use in the reverse direction or on the back of a frame member as opposed to a front frame mounting by moving both bolts 62A, 62B from first and second upper apertures 63A, 63B to engage a pair of lower apertures 63C, 63D provided on bracket 60'.

Figure 16A:
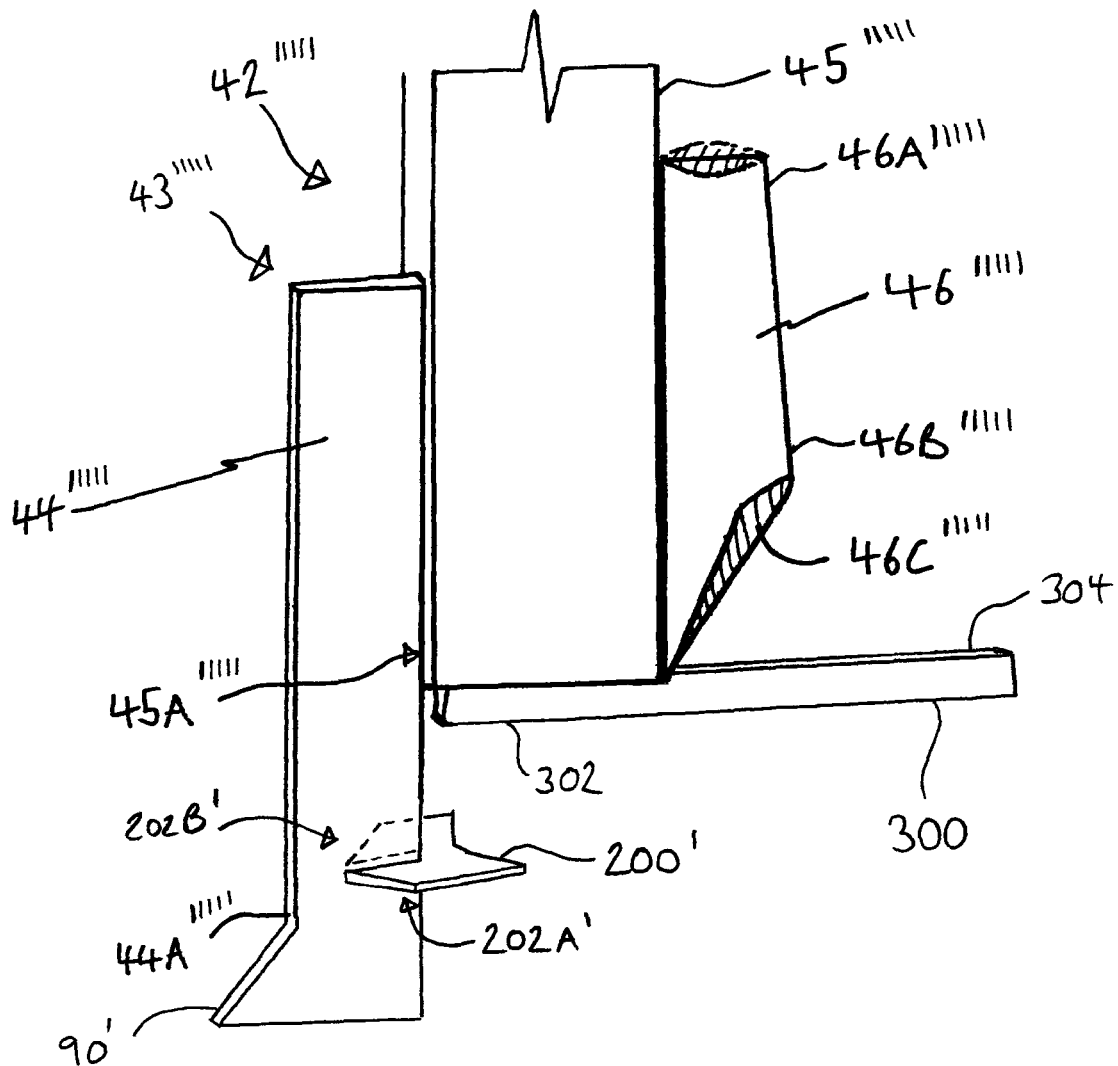
FIG. 16A is a schematic perspective side view of a yet further alternative soil opener including an enhanced soil displacement member for use in the seed drill device of FIG. 1.
Figure 16B:
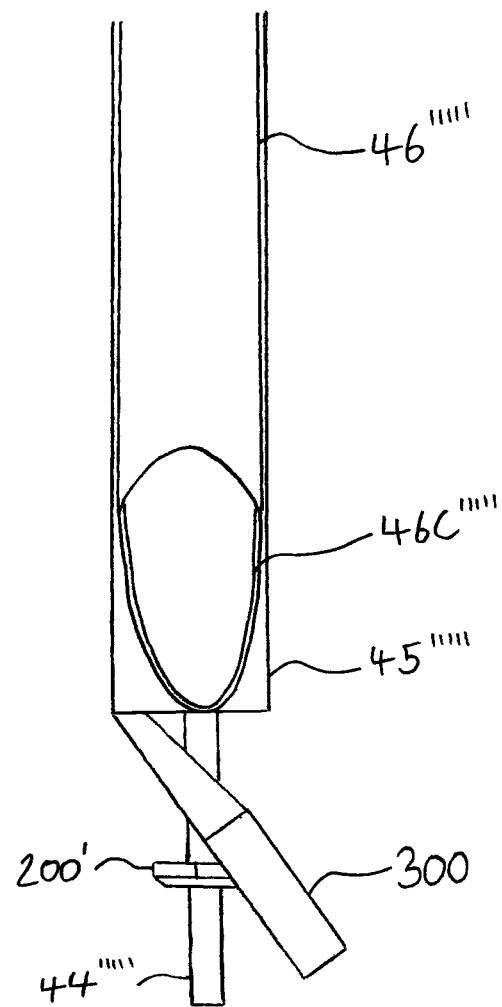
FIG. 16B is a schematic rear view of the soil opener of FIG. 16A.
Figure 16C:
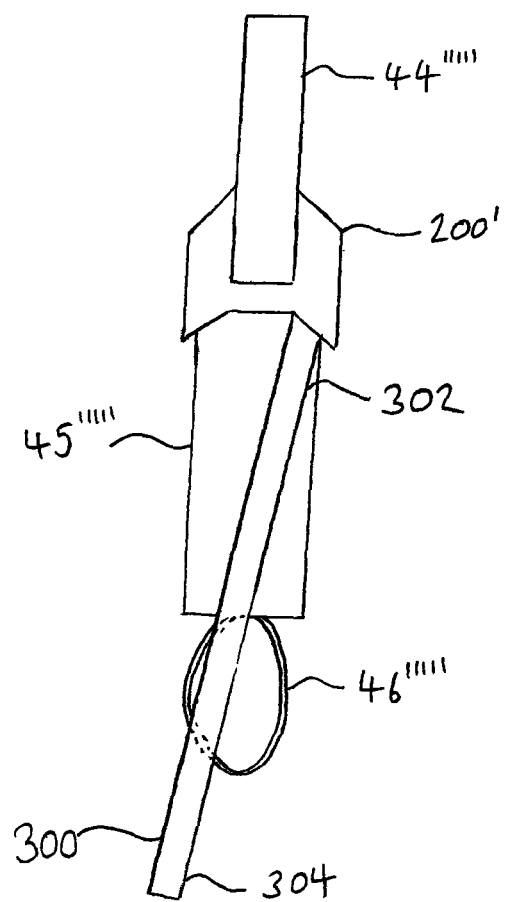
FIG. 16C is an underside view of the soil opener of FIG. 16A.

FIGS. 16A-C show an alternative seeding unit 42"" for use in seed drill device 10 comprising a soil opening tine 43"" including a soil opening blade 44"" mounted to the front of a blade support tine 45"". Soil opening blade 44"" defines a leading forward facing soil engagement surface 44A"" which defines a trailing forward facing soil engagement surface 45A"". An associated seed delivery outlet 46"" mounted on the rear of blade support tine 45"". Seed delivery outlet 46"" comprises an upper tubular body section 46A"" for connection to a seed delivery hose and a compressed lower body section 46B"" defining an inclined exit aperture 46C"" for releasing seed. In the case of a soil closing unit, seed delivery outlet 46"" would be omitted.

Soil opening blade 44"" includes a pointed leading profile 90' at its base and a soil lifting member (or "lifting wing") 200' defining a pair of laterally spaced, laterally extending soil lifting surfaces 202A', 202B' operative to lift/assist breakup of the soil.

Seeding unit 42"" additionally comprises a laterally inclined combined soil displacement/seed deflection blade member 300 mounted on an underside of blade support tine 45"", the combined soil displacement/seed deflection blade member 300 comprising a leading soil displacement part 302 and a trailing soil displacement/seed deflection part 304 extending along the full length of exit aperture 46C'"41. The combined soil displacement/seed deflection blade member 300 is angled so that the trailing soil displacement/seed deflection part 304 passes under a central part of exit aperture 46C"" so as to direct the falling seed toward the walls of the seed trench and additionally acts to press a proportion of the seed into an upper part of the trench wall. This side press action acts to reduce the likelihood of seed falling down too deeply into the trench where it would be too deep to emerge.

Figure 17A:
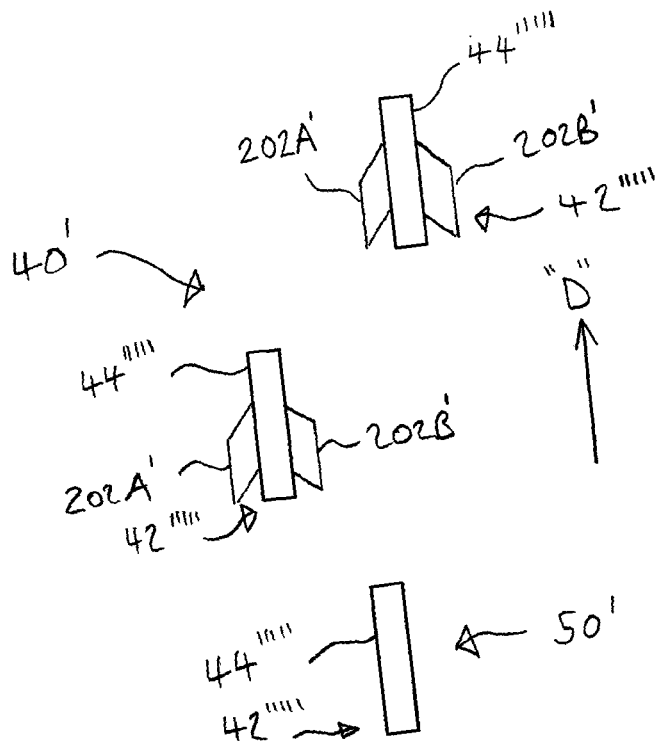
FIG. 17A is a schematic plan view showing a first soil opening/soil closing arrangement suitable for use in the seed drill device of FIG. 1.

FIG. 17A illustrates a first soil opening/soil closing arrangement suitable for use in the seed drill device of FIG. 1 comprising an opening stage 40' incorporating seeding units 42"" (for simplicity only soil opening blade 44"" and soil lifting surfaces 202A', 202B' of soil lifting member 200' are shown) and a closing stage 50' comprising a blade 44"" without a soil lifting member 200'. As illustrated, the soil lifting surfaces are provided on both sides of the staggered soil opening blades forming the opening stage 40'.

Figure 17B:
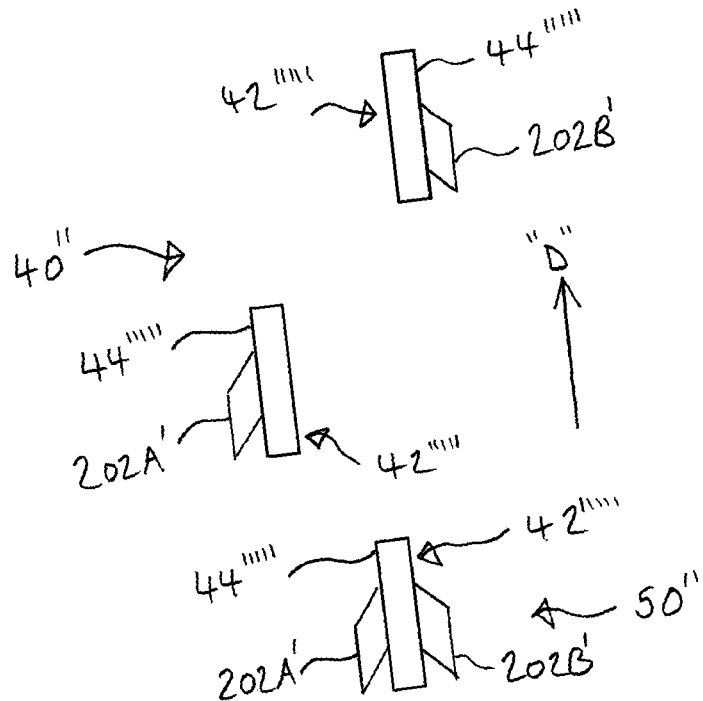
FIG. 17B is a schematic plan view showing a second soil opening/soil closing arrangement suitable for use with the seed drill device of FIG. 1.

FIG. 17B illustrates a second soil opening/soil closing arrangement suitable for use in the see drill device of FIG. 1 comprising an opening stage 40" and a closing stage 50". Opening stage 40" differs from opening stage 40' in that soil lifting surfaces are provided on only the outside of the staggered soil opening blades 44"" so that the soil in between the soil opening blades 44"" remains tightly packed. However, the blade 44"" of the closing stage 50' is now provided with soil lifting surfaces 202A', 202B' on both sides.

Figure 18A:
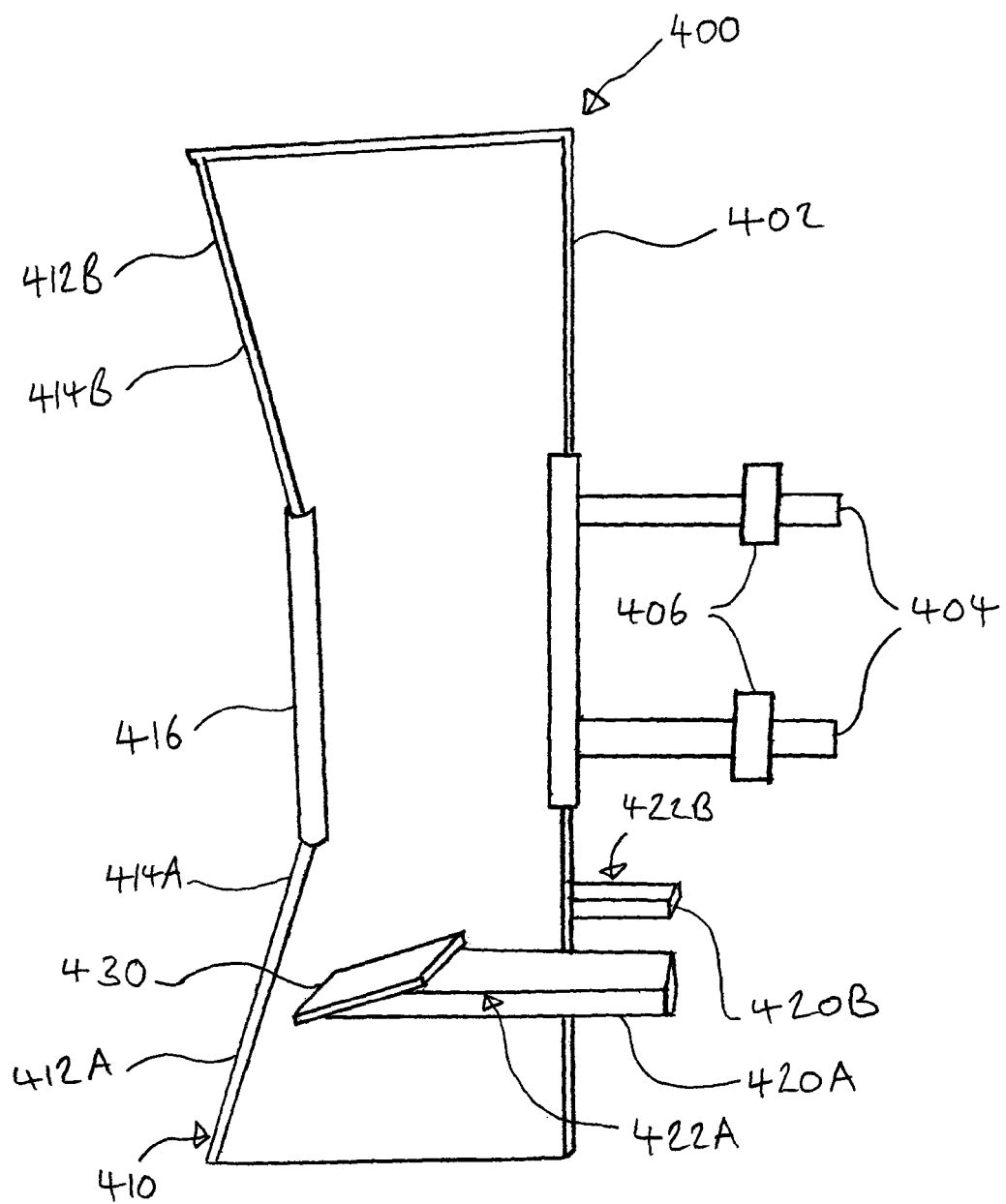
FIG. 18A is a schematic perspective side view of a first enhanced blade for use in the seed drill device of FIG. 1.

FIG. 18A shows a first enhanced soil opening blade 400 for use in the soil opening/soil closing stages of the seed drill device of FIG. 1. Soil opening blade 400 comprises a blade body 402 configured to be connected to a blade support tine via bolts 404 including locking nuts 406. Blade body 402 defines a leading forward facing soil engagement surface 410 and includes upper and lower inclined leading profiles 412A, 412B (enabling the blade to be installed either way up on the blade support tine) having beveled sharp edges 414A, 414B. Upper and lower inclined leading profiles 412A, 412B are spaced by a rounded vertical middle section 416 intended to deflect trash lifted from the field surface. Soil opening blade 400 has mounted thereon first and second soil lifting members (or "lifting wing") 420A, 420B together defining a pair of laterally spaced, laterally extending soil lifting surfaces 422A, 422B operative to lift/assist breakup of the soil. Each soil lifting member 420A, 420B includes an angled tungsten front plate 430 (typically set at an angle of 0-30° (e.g., 5-10°) from horizontal).

Figure 18B:
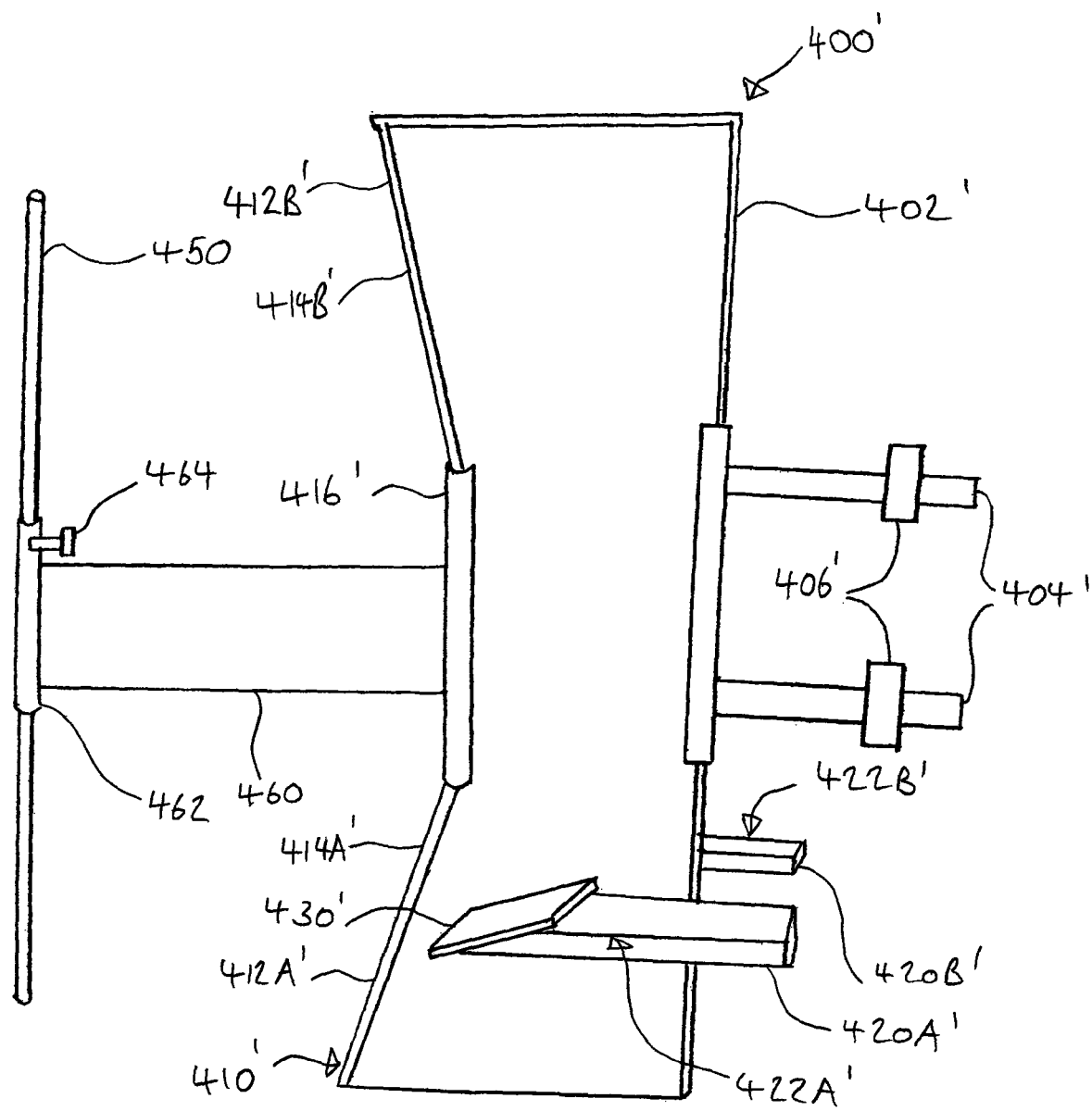
FIG. 18B is a schematic perspective side view of a second enhanced blade for use in the see drill device of FIG. 1.

FIG. 18B shows a second enhanced soil opening blade 400' based on soil opening blade 400 (features in common are labelled accordingly) further comprising a leading stubble rake tine 450 mounted to rounded middle section 416' via a bracket 460 including a mounting collar 462 with adjustable bolt 464. Leading stubble rake tine 450 may be formed from spring steel and is configured to flick straw and trash out of the path of the blade body 402.

Figure 19:
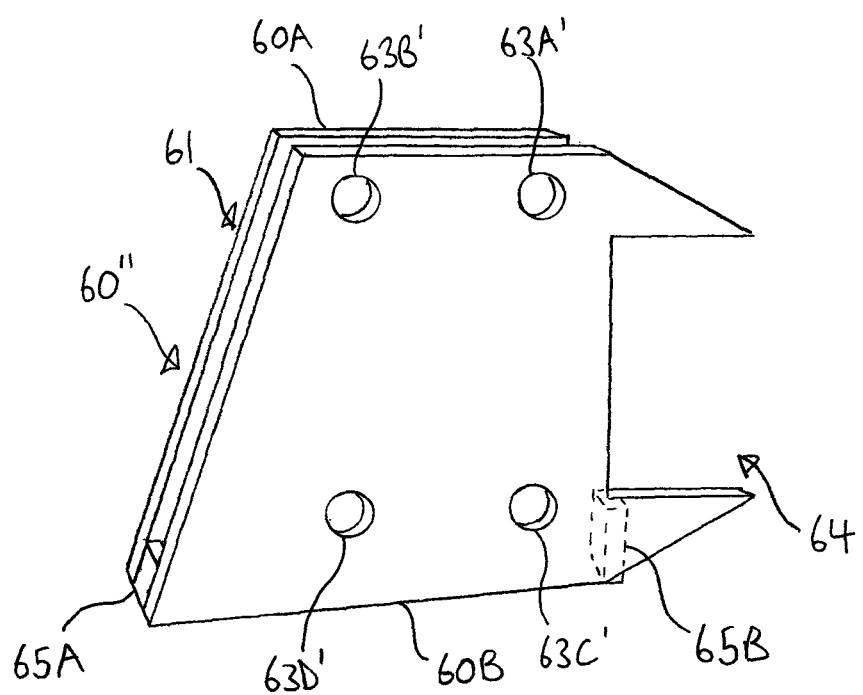
FIG. 19 is a schematic view of a bracket for mounting blade support tines to the frame of the seed drill device of FIG. 1.

FIG. 19 illustrates an alternative bracket 60" for mounting blade support tines 45, 55 to frame 30 of seed drill device 10 of FIG. 1. Bracket 60" comprises a body 61 formed by a pair of spaced plates 60A, 60B which together define a pair of upper apertures 63A', 63B' and a pair of lower apertures 63C', 63D' and a frame engaging portion 64 configured to be welded to frame 30. As shown, plates 60A, 60B have an extended lower section supporting front and rear lugs 65A, 65B welded in position between spaced plates 60A, 60B.

Figure 20B:
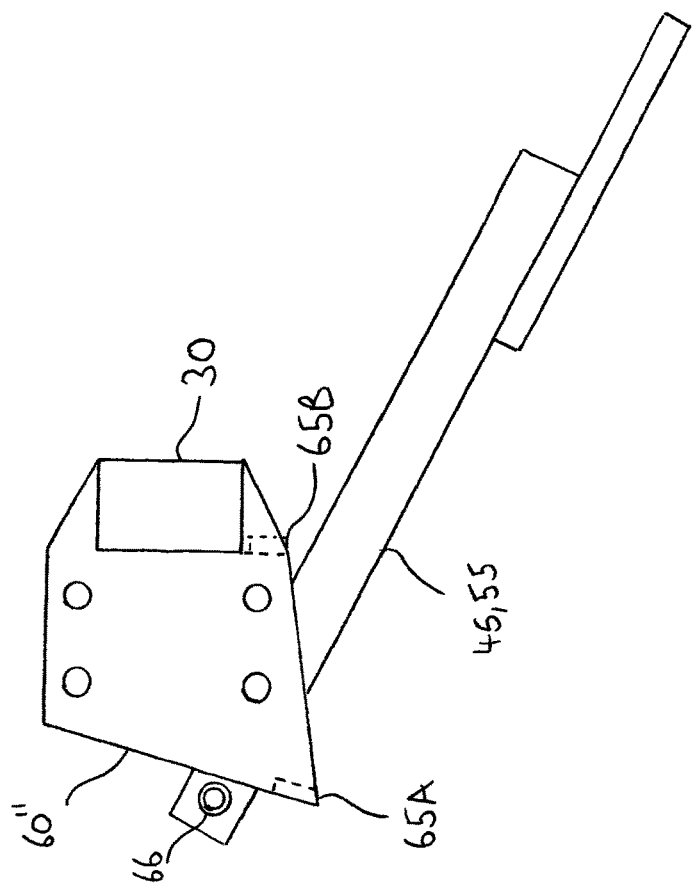
FIGS. 20A and 20B are schematic views illustrating the bracket of FIG. 19 in normal use supporting a blade support tine.
Figure 20A:
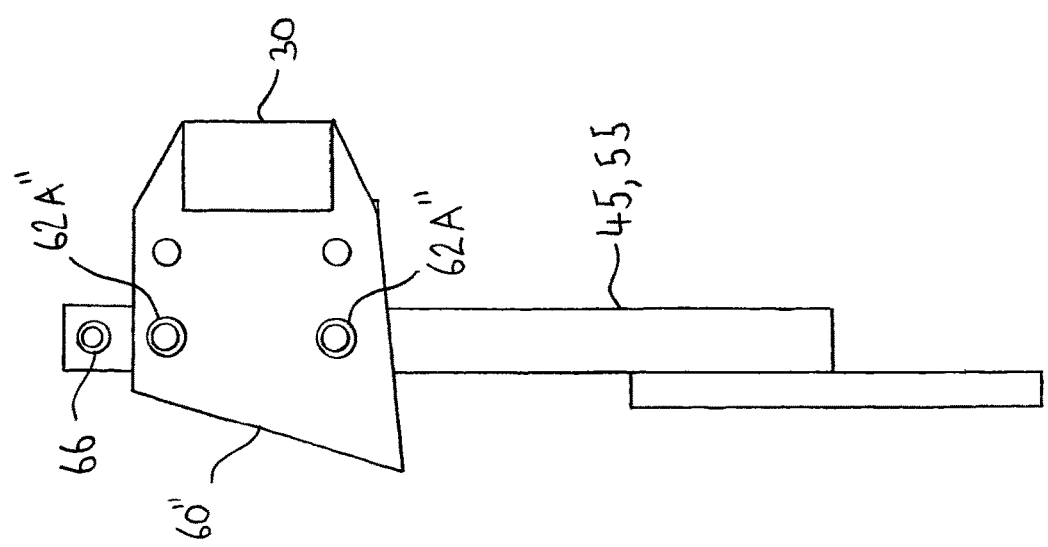

As illustrated in FIG. 20A, blade support tines 45, 55 are bolted in position (typically using a pair of bolts 62A" extending through apertures 63A', 63C' as illustrated in FIG. 19) and a protruding tether bolt 66 is attached to an upper end of blade support tines 45, 55 via apertures 45A, 55A shown in FIG. 15.

As shown in FIG. 20B, should blade support tines 45, 55 break out (e.g., in the event of an impact such a significant stone strike causing bolts 62A" to break), front lug 65A acts to catch blade support tines 45, 55 as they pivot within bracket 60", and the combination of front and rear lugs 65A, 65B together with tether bolt 66 operate to retain blade support tines 45, 55 in an inclined inoperative position in order to protect blade support tines 45, 55 from breakage.

The invention claimed is:

1. A seed drill, comprising:
a frame defining a leading part supporting a soil opening stage and a trailing part supporting a soil closing stage trailing the soil opening stage, wherein the soil opening stage comprises a plurality of laterally spaced seeding units, each seeding unit comprising a soil opening member associated with a respective seed delivery outlet connected to a seed source, wherein each soil opening member comprises a soil opening drilling tine supported by a soil opening support tine, a bottom end of the soil opening support tine substantially vertically aligned with a bottom end of the respective seed delivery outlet, and each seeding unit is configured to form a respective seeded trench in the ground when the seed drill is in use driven through soil in a forward direction of travel;
wherein the soil closing stage comprises a plurality of laterally spaced soil deflection members each associated with a respective one of the seeding units, wherein each soil deflection member comprises a soil closing drilling tine and a soil closing support tine, each soil deflection member being spaced laterally from the soil opening member of its respective seeding unit and configured to deflect soil toward the seeded trench formed by the seeding unit;
wherein each soil deflection member is configured to form an unseeded trench that is spaced laterally from the seeded trench formed by its respective seeding unit and deflect soil removed to form the unseeded trench toward the seeded trench.

2. The seed drill of claim 1, wherein the seed drill is configured to function without any soil levelling device.

3. The seed drill of claim 1, wherein each soil deflection member is associated with a pair of seeding units.

4. The seed drill of claim 3, wherein the soil deflection member is positioned laterally between the pair of seeding units.

5. The seed drill of claim 3, wherein the seeding units of each pair are longitudinally spaced from one another.

6. The seed drill of claim 1, wherein each soil deflection member is longitudinally offset relative to a neighboring soil deflection member.

7. The seed drill of claim 1, wherein each soil opening member is set to a first depth and the associated soil deflection member is set to a second depth, wherein the first depth is greater than the second depth.

8. The seed drill of claim 1, wherein the depth of each soil opening member and/or associated soil deflection member is adjustable.

9. The seed drill of claim 1, wherein the trailing soil opening member is associated with a pest control composition delivery device.

10. A method of sowing seed using the seed drill of claim 1, comprising:
forming a plurality of seeded trench sections in soil; and
subsequently forming adjacent each seeded trench section an unseeded soil displacement trench section, the unseeded soil displacement trench section being positioned relative to the seeded trench section such that soil displaced during formation of the unseeded soil displacement trench section covers the adjacent seeded trench section.

11. The method of claim 10, wherein the step of subsequently forming the unseeded soil displacement trench sections comprises forming the unseeded soil displacement trench sections between adjacent pairs of seeded trench sections.

12. The method of claim 10, wherein the step of forming the plurality of seeded trench sections is performed by a leading part of the seed drill, and the step of subsequently forming the unseeded soil displacement trench sections adjacent each seeded trench section is performed by a trailing part of the seed drill.

13. The method of claim 10, wherein the method further comprises depositing a pest control composition into the unseeded soil displacement trench.

14. The method of claim 10, wherein the method includes leaving the unseeded soil displacement trench sections open to the environment.

15. The seed drill of claim 1, wherein:
each seeding unit comprises a seed delivery outlet comprising an upper body section for connection to a seed delivery hose and a lower body section defining an exit aperture for releasing seed; and
each soil opening member is mounted to a support, wherein the soil opening support tine comprises a first soil engaging part and the soil opening drilling tine comprises a second soil engaging part, the second soil engaging part defining a leading forward facing soil engagement surface and the first soil engaging part defining a trailing forward facing soil engagement surface;
wherein the second soil engaging part projects beyond a lower edge of the first soil engaging part to form a leading trench portion which is deeper than a main trench portion formed by the first soil engaging part.

16. The seed drill of claim 15, wherein the seed drill further comprises an elongate longitudinally extending seed deflection blade member configured to deflect seed exiting the seed delivery outlet towards a wall of the main trench portion formed by the first soil engaging part.

17. The seed drill of claim 16, wherein the elongate longitudinally extending seed deflection blade member defines a longitudinally extending deflection surface positioned below the seed delivery outlet and extending substantially along a full longitudinal length of the seed delivery outlet.

18. The seed drill of claim 17, wherein the elongate longitudinally extending deflection surface is angled so that the elongate longitudinally extending seed deflection blade member passes under a central part of the exit aperture so as to direct falling seed into an upper part of a trench wall formed by the soil opening member.

19. The seed drill of claim 16, wherein the elongate longitudinally extending seed deflection blade member is mounted to the lower edge of the first soil engaging part such that the elongate longitudinally extending seed deflection blade member is positioned below the first soil engaging part.

20. The seed drill of claim 15, wherein the second soil engaging part is positioned in advance of the first soil engaging part.

21. The seed drill of claim 15, wherein the second soil engaging part comprises a blade.

* * * * *